United States Patent
Seki

(10) Patent No.: US 12,464,224 B2
(45) Date of Patent: Nov. 4, 2025

(54) ELECTRONIC APPARATUS, CONTROL METHOD OF ELECTRONIC APPARATUS, AND NON-TRANSITORY COMPUTER-READABLE MEDIUM WITH FIRST INDICATOR AND SECOND INDICATOR SUPERIMPOSED ON IMAGE

(71) Applicant: CANON KABUSHIKI KAISHA, Tokyo (JP)

(72) Inventor: Takashi Seki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 191 days.

(21) Appl. No.: 18/162,809

(22) Filed: Feb. 1, 2023

(65) Prior Publication Data
US 2023/0300453 A1  Sep. 21, 2023

(30) Foreign Application Priority Data
Feb. 14, 2022  (JP) .................. 2022-020270

(51) Int. Cl.
*H04N 23/611* (2023.01)
*H04N 23/63* (2023.01)
*H04N 23/663* (2023.01)

(52) U.S. Cl.
CPC .................. *H04N 23/634* (2023.01)

(58) Field of Classification Search
None
See application file for complete search history.

(56) References Cited

U.S. PATENT DOCUMENTS

| 10,636,166 | B1* | 4/2020 | Armstrong | G06V 20/13 |
| 10,848,660 | B2 | 11/2020 | Saito et al. | |
| 2011/0052009 | A1* | 3/2011 | Berkovich | G02B 27/01 382/106 |
| 2018/0074332 | A1* | 3/2018 | Li | G06F 3/012 |
| 2018/0139394 | A1* | 5/2018 | Ota | H04N 5/2628 |
| 2019/0208132 | A1 | 7/2019 | Saito et al. | |
| 2020/0096839 | A1* | 3/2020 | Shigeta | H04N 23/67 |

FOREIGN PATENT DOCUMENTS

JP   2018-169517 A   11/2018

OTHER PUBLICATIONS

Virtual Reality Oasis, "Oculus Quest Setup, Unboxing & Tips", https://www.youtube.com/watch?v=pwaeL27JSLw, May 2, 2019.*

* cited by examiner

*Primary Examiner* — Edemio Navas, Jr.
(74) *Attorney, Agent, or Firm* — Venable LLP

(57) ABSTRACT

An electronic apparatus according to the present invention acquires a captured image, performs control such that an indicator is displayed so as to be superimposed on the acquired image, wherein in a case where an image in which a first image area captured via a first optical system and a second image area captured via a second optical system are arranged side by side is acquired, control is performed such that a first indicator is displayed so as to be superimposed on the first image area and a second indicator is displayed so as to be superimposed on the second image area, control is performed such that one indicator is moved in response to execution of an operation of moving the one indicator by a user, and control is performed such that another one indicator is moved in synchronization with the movement of the one indicator.

13 Claims, 13 Drawing Sheets

NON-IMAGING SURFACE PHASE DIFFERENCE METHOD   PIXEL CONFIGURATION

| R | Gr | R | Gr | R | Gr | R | Gr | R | Gr |
|---|----|---|----|---|----|---|----|---|----|
| Gb | B | Gb | B | Gb | B | Gb | B | Gb | B |

IMAGING SURFACE PHASE DIFFERENCE METHOD   PIXEL CONFIGURATION

| R A | R B | Gr A | Gr B | R A | R B | Gr A | Gr B | R A | R B | Gr A | Gr B | R A | R B | Gr A | Gr B | R A | R B | Gr A | Gr B |
|-----|-----|------|------|-----|-----|------|------|-----|-----|------|------|-----|-----|------|------|-----|-----|------|------|
| Gb A | Gb B | B A | B B | Gb A | Gb B | B A | B B | Gb A | Gb B | B A | B B | Gb A | Gb B | B A | B B | Gb A | Gb B | B A | B B |

IN-FOCUS STATE

FRONT FOCUS

REAR FOCUS

SIGNIFICANTLY OUT-OF-FOCUS STATE

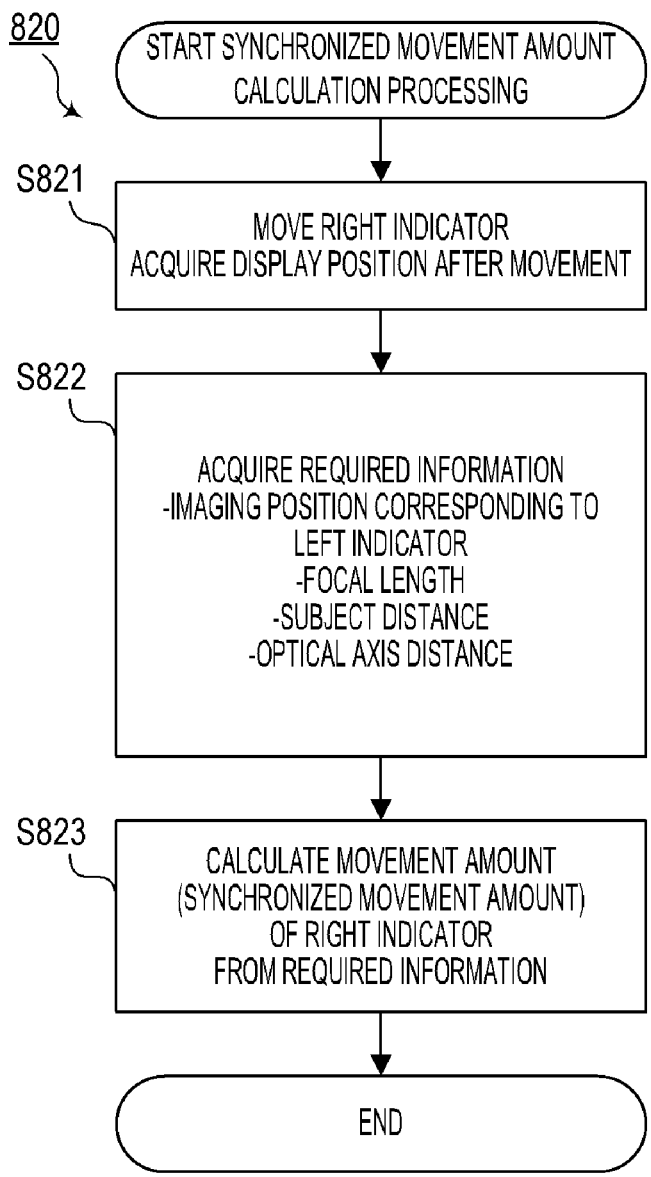

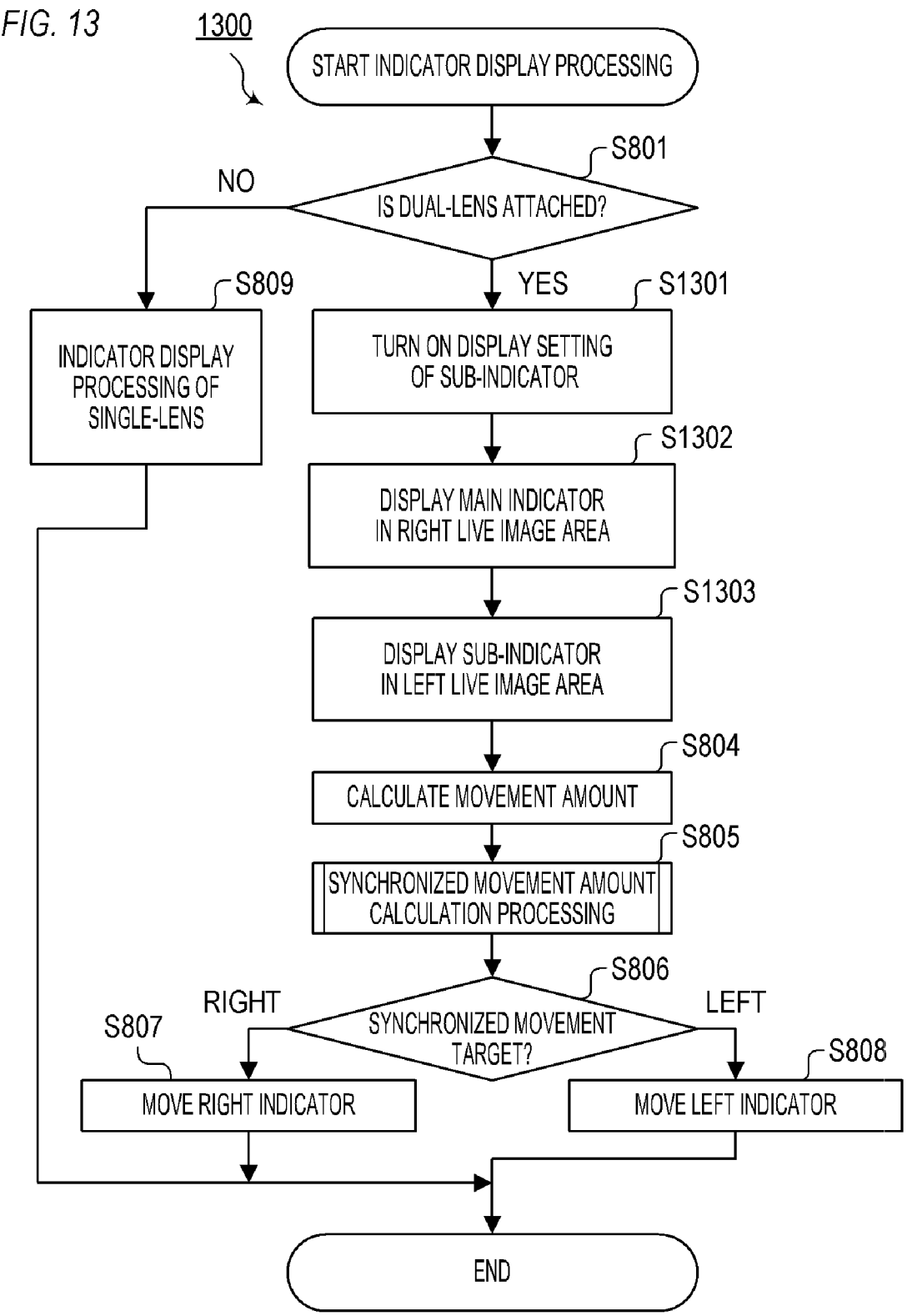

ELECTRONIC APPARATUS, CONTROL METHOD OF ELECTRONIC APPARATUS, AND NON-TRANSITORY COMPUTER-READABLE MEDIUM WITH FIRST INDICATOR AND SECOND INDICATOR SUPERIMPOSED ON IMAGE

BACKGROUND OF THE INVENTION

Field of the Invention

The present invention relates to an electronic apparatus, a control method of electronic apparatus, and a non-transitory computer-readable medium.

Description of the Related Art

There is known a technique for acquiring two images (two wide-view-angle images) having a parallax by using two optical systems and displaying the two images so as to allow stereoscopic vision thereof. A dual-lens camera for photographing two images having a parallax has two optical systems directed in the same direction, and can photograph the two images having the parallax at a time. A technique related to the dual-lens camera is disclosed in, e.g., Japanese Patent Application Publication No. 2018-169517.

In a digital camera to and from which a lens unit is attachable and detachable, there are cases where a single-lens unit and a dual-lens unit are used while being replaced with each other. In the case where the single-lens unit is attached and the digital camera is used as a single-lens camera, for example, one live image captured by using one optical system is displayed. In the case where the dual-lens unit is attached and the digital camera is used as a dual-lens camera, for example, one live image in which two live image areas (two image areas having a parallax) captured by using two optical systems individually are arranged side by side is displayed.

However, in a conventional dual-lens camera (including the case where a dual-lens unit is attached to a digital camera), it is not possible to properly display an indicator for one image in which two image areas captured by using two optical systems individually are arranged side by side.

SUMMARY OF THE INVENTION

The present invention provides a technique capable of properly displaying an indicator for one image in which two image areas captured by using two optical systems individually are arranged side by side.

An electronic apparatus according to the present invention, includes: a processor; and a memory storing a program which, when executed by the processor, causes the electronic apparatus to acquire an image captured by an imaging element, receive an operation by a user, perform control such that the image is displayed, and perform control such that an indicator is displayed so as to be superimposed on the image, wherein in a case where an image in which a first image area captured via a first optical system and a second image area captured via a second optical system are arranged side by side is acquired, control is performed such that a first indicator is displayed so as to be superimposed on the first image area, control is performed such that a second indicator is displayed so as to be superimposed on the second image area, control is performed such that one of the first indicator and the second indicator is moved in response to execution of an operation of moving the one of the first indicator and the second indicator by the user, and control is performed such that another one of the first indicator and the second indicator is moved in synchronization with the movement of the one of the first indicator and the second indicator.

Further features of the present invention will become apparent from the following description of exemplary embodiments with reference to the attached drawings.

BRIEF DESCRIPTION OF THE DRAWINGS

FIGS. 8B and 8C are flowcharts showing synchronized movement amount calculation processing according to Embodiment 1;

FIG. 13 is a flowchart showing indicator display processing according to Embodiment 3.

DESCRIPTION OF THE EMBODIMENTS

Hereinbelow, embodiments of the present invention will be described with reference to the drawings. In the following embodiments, a description will be given of an example in which the present invention is applied to a digital camera (interchangeable-lens camera) to and from which a lens unit is attachable and detachable.

Embodiment 1

Hardware Configuration

Figure 1A:
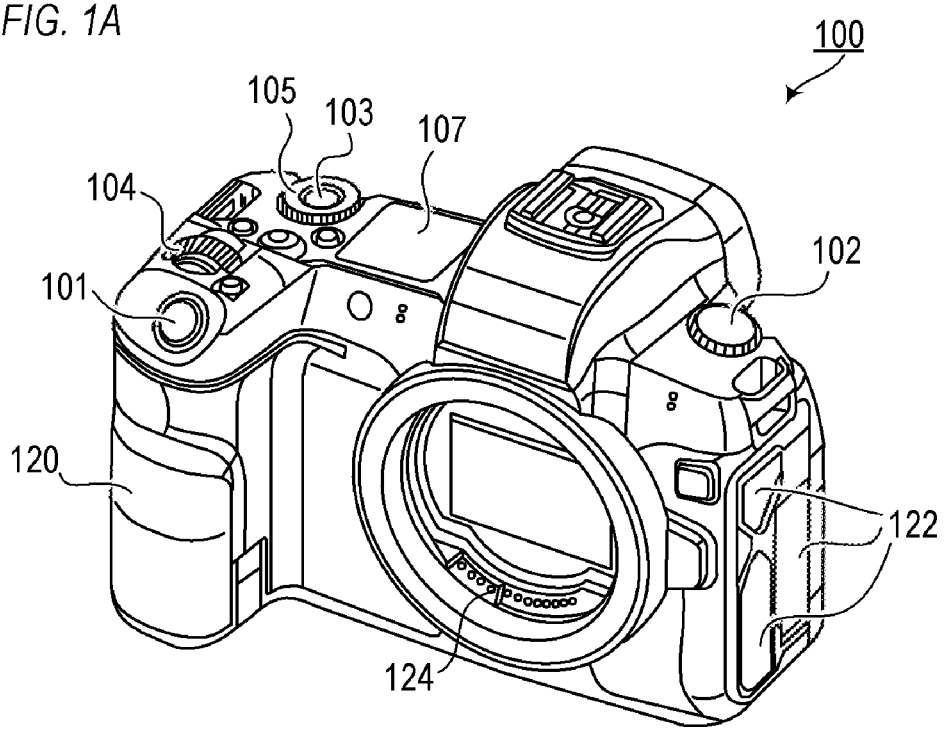
FIGS. 1A and 1B are external views of a camera.
Figure 1B:
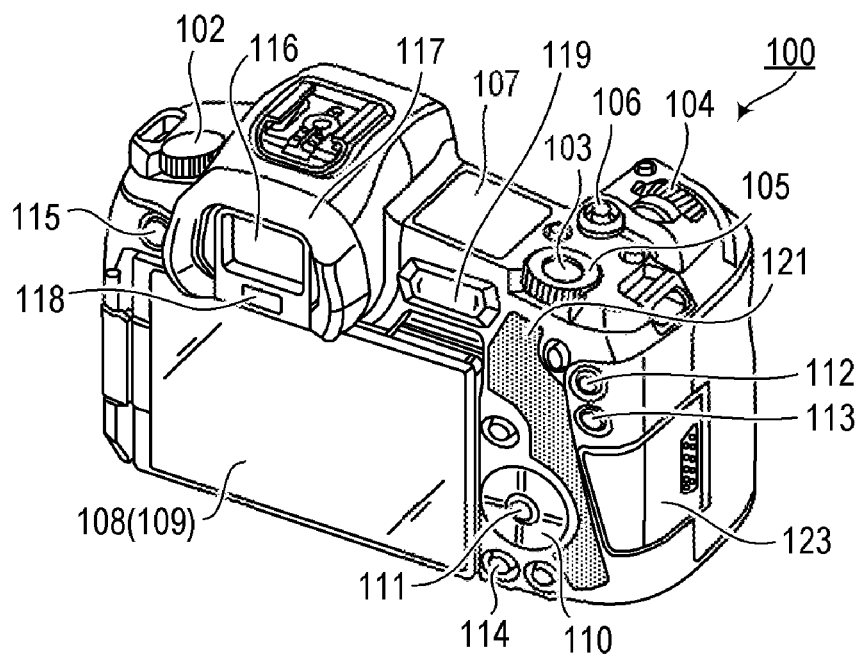

FIGS. 1A and 1B are external views each showing an exterior of a digital camera (camera) 100 according to Embodiment 1. FIG. 1A is a perspective view when the camera 100 is viewed from the side of the front, and FIG. 1B is a perspective view when the camera 100 is viewed from the side of the back.

The camera 100 has, on its upper surface, a shutter button 101, a power switch 102, a mode switching switch 103, a main electronic dial 104, a sub-electronic dial 105, a movie button 106, and an outside-viewfinder display unit 107. The shutter button 101 is an operation member for performing a photographing preparation instruction or a photographing instruction. The power switch 102 is an operation member for switching between ON and OFF of power supply of the camera 100. The mode switching switch 103 is an operation member for switching among various modes. The main electronic dial 104 is a rotary operation member for changing set values such as a shutter speed and an aperture. The sub-electronic dial 105 is a rotary operation member for performing movement of a selection frame (cursor) and image feed. The movie button 106 is an operation member for performing instructions such as a start and a stop of movies shooting (recording). The outside-viewfinder display unit 107 displays various set values such as a shutter speed and an aperture.

The camera 100 has, on its back surface, a display unit 108, a touch panel 109, a direction key 110, an SET button 111, an AE lock button 112, an enlargement button 113, a playback button 114, a menu button 115, an eyepiece portion 116, an eye approach detection unit 118, and a touch bar 119. The display unit 108 displays images and various pieces of information. The touch panel 109 is an operation member which detects a touch operation to a display surface (touch operation surface) of the display unit 108. The direction key 110 is an operation member constituted by a key (four-direction key) which can be pressed down in up, down, left, and right directions. Processing corresponding to a position where the direction key 110 is pressed down is allowed. The SET button 111 is an operation member which is pressed down mainly when a selection item is determined. The AE lock button 112 is an operation member which is pressed down when an exposure state is fixed in a photographing standby state. The enlargement button 113 is an operation member for switching between ON and OFF of an enlargement mode in live-view display (LV display) of the photographing mode. In the case where the enlargement mode is ON, a live-view image (LV image) is enlarged or reduced by operating the main electronic dial 104. In addition, the enlargement button 113 is used when, in a playback mode, a playback image is enlarged or an enlargement ratio is increased. The playback button 114 is an operation member for switching between the photographing mode and the playback mode. In the case of the photographing mode, the photographing mode is shifted to the playback mode by pressing down the playback button 114, and it is possible to display the latest image selected from among images recorded in a recording medium 227 described later in the display unit 108.

The menu button 115 is an operation member which is pressed down for displaying a menu screen on which various settings can be performed in the display unit 108. A user can perform various settings instinctively by using the menu screen displayed in the display unit 108, the direction key 110, and the SET button 111. The eyepiece portion 116 is a portion in which the user looks into an eyepiece viewfinder (looking-into type viewfinder) 117 with an eye in contact with the eyepiece viewfinder 117. The user can visually recognize an image displayed in an EVF 217 (Electronic View Finder) described later which is positioned inside the camera 100 via the eyepiece portion 116. The eye approach detection unit 118 is a sensor which detects whether or not the eye of the user is in contact with the eyepiece portion 116 (the eyepiece viewfinder 117).

The touch bar 119 is a linear touch operation member (line touch sensor) capable of receiving a touch operation. The touch bar 119 is disposed at a position which allows a touch operation (allows a touch) with the thumb of the right hand in a state in which a grip portion 120 is gripped by the right hand (a state in which the grip portion 120 is gripped by the little finger, the third finger, and the middle finger of the right hand) such that the shutter button 101 can be pressed down by the index finger of the right hand. That is, the touch bar 119 can be operated in a state (photographing orientation) in which the user brings the eye into contact with the eyepiece viewfinder 117 to look into the eyepiece portion 116 and holds the camera 100 up so as to be able to press down the shutter button 101 at any moment. The touch bar 119 can receive a tap operation to the touch bar 119 (an operation in which the touch bar 119 is touched by the thumb and the thumb is separated from the touch bar 119 within a predetermined time period without moving a touch position), and a slide operation in a left-to-right direction (an operation in which, after the touch bar 119 is touched, the touch position is moved while the touch bar 119 is continuously touched). The touch bar 119 is an operation member which is different from the touch panel 109, and does not include a display function. The touch bar 119 functions as, e.g., a multi-function bar (M-Fn bar) to which various functions can be assigned.

In addition, the camera 100 has the grip portion 120, a thumb rest portion 121, terminal covers 122, a lid 123, and a communication terminal 124. The grip portion 120 is a holding portion which is formed into a shape which can be easily gripped by the right hand when the user holds the camera 100 up. The shutter button 101 and the main electronic dial 104 are disposed at positions which allow the index finger of the right hand to operate the shutter button 101 and the main electronic dial 104 in a state in which the camera 100 is held by gripping the grip portion 120 with the little finger, the third finger, and the middle finger of the right hand. In addition, in the similar state, the sub-electronic dial 105 and the touch bar 119 are disposed at positions which allow the thumb of the right hand to operate the sub-electronic dial 105 and the touch bar 119. The thumb rest portion 121 (thumb standby position) is a grip portion which is provided at a location which allows easy placement of the thumb of the right hand which grips the grip portion 120 in a state in which no operation member on the side of the back surface of the camera 100 is operated. The thumb rest portion 121 is constituted by a rubber member or the like for increasing a holding force (grip feeling). Each terminal cover 122 protects a connector such as a connection cable or the like for connecting the camera 100 to external equipment (external apparatus). The lid 123 closes a slot for storing the recording medium 227 described later to thereby protect the recording medium 227 and the slot. The communication terminal 124 is a terminal for performing communication with the side of a lens unit (a lens unit 200 and a lens unit 300 described later) which is attachable to and detachable from the camera 100.

Hardware Configuration Inside Camera

Figure 2:
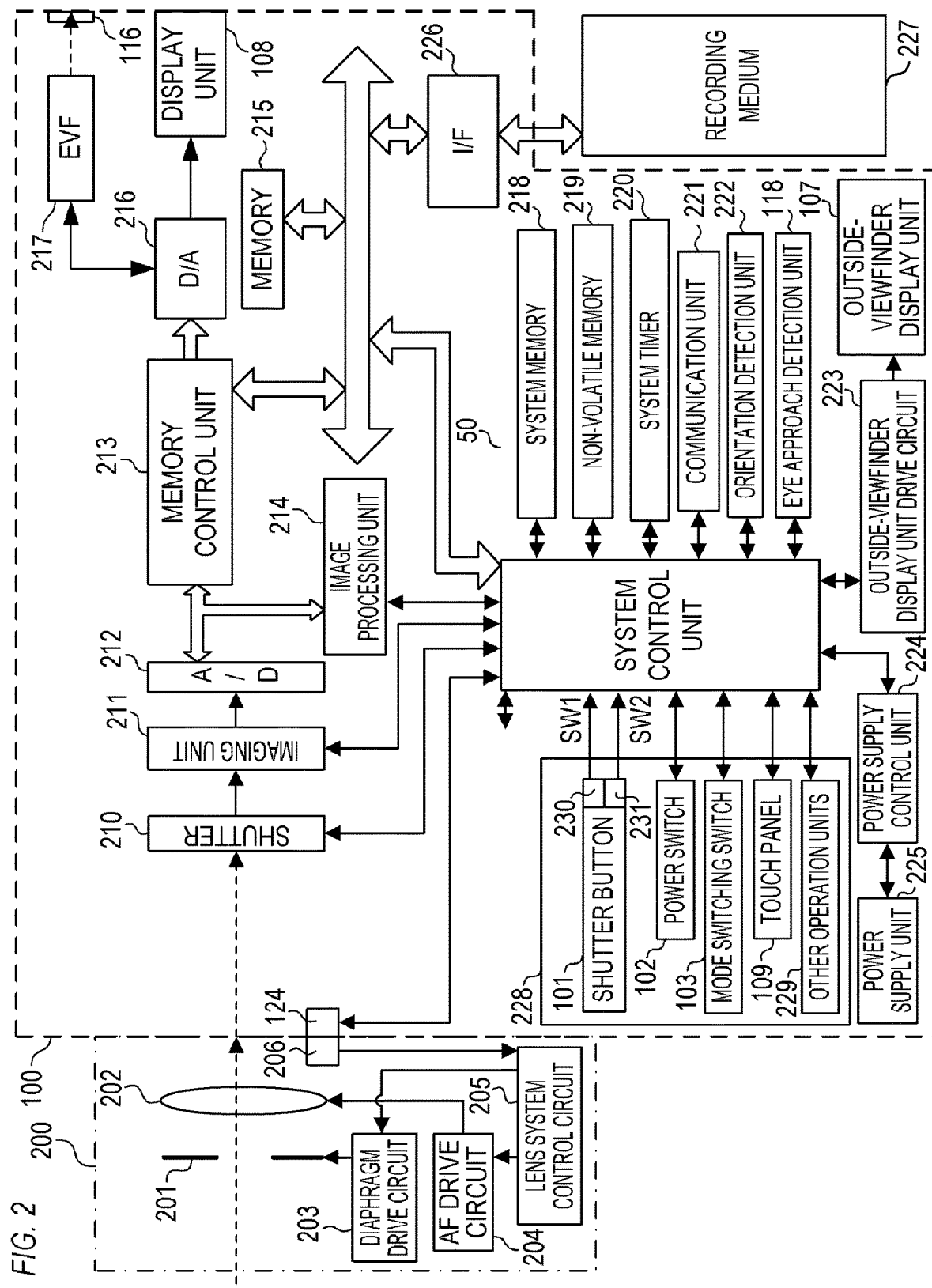
FIG. 2 is a block diagram showing a configuration of the camera.

FIG. 2 is a block diagram showing a configuration of the camera 100. Note that the same components as those in FIGS. 1A and 1B are designated by the same reference numerals as those in FIGS. 1A and 1B, and the description of the components will be appropriately omitted. In FIG. 2, the lens unit 200 is attached to the camera 100.

First, the lens unit 200 will be described. The lens unit 200 is a type of an interchangeable-lens unit which is attachable to and detachable from the camera 100. The lens unit 200 is a single-lens unit (monocular lens unit), and is an example of an ordinary lens unit. The lens unit 200 has a diaphragm 201, a lens 202, a diaphragm drive circuit 203, an AF (autofocus) drive circuit 204, a lens system control circuit 205, and a communication terminal 206.

The diaphragm 201 is configured to be able to adjust an aperture diameter. The lens 202 is constituted by a plurality of lenses. The diaphragm drive circuit 203 adjusts a light amount by controlling the aperture diameter of the diaphragm 201. The AF drive circuit 204 drives the lens 202 to obtain focus. The lens system control circuit 205 controls the diaphragm drive circuit 203 and the AF drive circuit 204 based on an instruction of a system control unit 50 described later. The lens system control circuit 205 performs control of the diaphragm 201 via the diaphragm drive circuit 203, and obtains focus by changing the position of the lens 202 via the AF drive circuit 204. The lens system control circuit 205 can communicate with the camera 100. Specifically, the communication is performed via the communication terminal 206 of the lens unit 200 and the communication terminal 124 of the camera 100. The communication terminal 206 is a terminal for the lens unit 200 to perform communication with the side of the camera 100.

Next, the camera 100 will be described. The camera 100 has a shutter 210, an imaging unit 211, an A/D converter 212, a memory control unit 213, an image processing unit 214, a memory 215, a D/A converter 216, the EVF 217, the display unit 108, and the system control unit 50.

The shutter 210 is a focal plane shutter which can freely control exposure time of the imaging unit 211 based on an instruction of the system control unit 50. The imaging unit 211 is an imaging element (image sensor) constituted by a CCD or a CMOS element which converts an optical image to an electrical signal. The imaging unit 211 may have an imaging surface phase difference sensor which outputs defocus amount information to the system control unit 50. The A/D converter 212 converts an analog signal output from the imaging unit 211 to a digital signal. The image processing unit 214 performs predetermined processing (pixel interpolation, resizing processing such as reduction, color conversion processing, and the like) on data from the A/D converter 212 or data from the memory control unit 213. In addition, the image processing unit 214 performs predetermined arithmetic processing by using captured image data, and the system control unit 50 performs exposure control and distance measurement control based on the obtained arithmetic processing result. With this processing, TTL (through the lens)-method AF processing, AE (autoexposure) processing, and EF (flash pre-firing) processing are performed. Further, the image processing unit 214 performs predetermined arithmetic processing by using the captured image data, and the system control unit 50 performs TTL-method AWB (Auto White Balance) processing based on the obtained arithmetic processing result.

Image data from the A/D converter 212 is written into the memory 215 via the image processing unit 214 and the memory control unit 213. Alternatively, the image data from the A/D converter 212 is written into the memory 215 via the memory control unit 213 without the intervention of the image processing unit 214. The memory 215 stores image data which is obtained by the imaging unit 211 and is converted to digital data by the A/D converter 212, and image data to be displayed in the display unit 108 and the EVF 217. The memory 215 includes memory capacity sufficient to store a predetermined number of still images, a dynamic image of predetermined time, and sound. In addition, the memory 215 also serves as a memory for image display (video memory).

The D/A converter 216 converts image data for display stored in the memory 215 into an analog signal, and supplies the analog signal to the display unit 108 or the EVF 217. Accordingly, the image data for display written into the memory 215 is displayed in the display unit 108 or the EVF 217 via the D/A converter 216. Each of the display unit 108 and the EVF 217 performs display corresponding to the analog signal from the D/A converter 216. Each of the display unit 108 and the EVF 217 is, e.g., an LCD or an organic EL display. The digital signal which is subjected to A/D conversion by the A/D converter 212 and is accumulated in the memory 215 is converted to the analog signal in the D/A converter 216 and the analog signal is sequentially transferred to and displayed in the display unit 108 or the EVF 217, and live-view display is thereby performed.

The system control unit 50 is a control unit constituted by at least one processor and/or at least one circuit. That is, the system control unit 50 may be a processor, a circuit, or a combination of the processor and the circuit. The system control unit 50 controls the entire camera 100. The system control unit 50 implements each processing in a flowchart described later by executing a program recorded in a non-volatile memory 219. In addition, the system control unit 50 also performs display control by controlling the memory 215, the D/A converter 216, the display unit 108, and the EVF 217.

In addition, the camera 100 has a system memory 218, the non-volatile memory 219, a system timer 220, a communication unit 221, an orientation detection unit 222, and the eye approach detection unit 118.

As the system memory 218, for example, a RAM is used. Into the system memory 218, constants and variables for operations of the system control unit 50, and a program read from the non-volatile memory 219 are loaded. The non-volatile memory 219 is a memory capable of electrical erasing and recording and, for example, an EEPROM is used as the non-volatile memory 219. In the non-volatile memory 219, constants for operations of the system control unit 50 and a program are recorded. The program mentioned herein is a program for executing a flowchart described later. The system timer 220 is a time measurement unit which measures time used for various control operations and time of an embedded clock. The communication unit 221 performs transmission and reception of a video signal and a sound signal with external equipment connected wirelessly or with a cable. The communication unit 221 can also be connected to a wireless LAN (Local Area Network) and the Internet. In addition, the communication unit 221 can also communicate with the external equipment with Bluetooth (registered trademark) and Bluetooth Low Energy. The communication unit 221 can transmit an image captured in the imaging unit 211 (including a live image) and an image recorded in the recording medium 227, and can receive an image and other various pieces of information from the external equipment. The orientation detection unit 222 detects an orientation (inclination) of the camera 100 with respect to a gravity direction. It is possible to detect an inclination angle of the camera 100 in a horizontal direction (left-to-right direction) or a vertical direction (up-and-down direction; front-and-rear direction) based on the orientation detected in the orientation detection unit 222. In addition, it is possible to determine whether an image captured in the imaging unit 211 is an image captured when the camera 100 is held laterally or an image captured when the camera 100 is held vertically based on the orientation detected in the orientation detection unit 222. The system control unit 50 can add orientation information corresponding to the orientation detected in the orientation detection unit 222 to an image file of the image captured in the imaging unit 211, and rotate the image according to the detected orientation. It is also possible to detect movement of the camera 100 (whether or not the camera 100 is panned, tilted, lifted, or still) by using the orientation detection unit 222. As the orientation detection unit 222, it is possible to use, e.g., an acceleration sensor or a gyro sensor.

The eye approach detection unit 118 can detect approach of any object to the eyepiece portion 116 (eyepiece viewfinder 117). As the eye approach detection unit 118, it is possible to use, e.g., an infrared proximity sensor. In the case where the object has approached, infrared light emitted from a light projection portion of the eye approach detection unit 118 is reflected on the object, and is received by a light-receiving portion of the infrared proximity sensor. With the amount of the received infrared light, it is possible to determine a distance to the object from the eyepiece portion 116. Thus, the eye approach detection unit 118 performs eye approach detection which detects an approach distance of the object to the eyepiece portion 116. The eye approach detection unit 118 is an eye approach detection sensor which detects approach (eye approach) and separation (eye separation) of an eye (object) to and from the eyepiece portion 116. In the case where an object which approaches within a predetermined distance of the eyepiece portion 116 is detected in a non-eye approach state (non-approach state), it is detected that the eye has approached. On the other hand, in the case where the object of which the approach is detected has moved away by a predetermined distance or longer in an eye approach state (approach state), it is detected that the eye has been separated. A threshold value for detecting the eye approach and a threshold value for detecting the eye separation may be made different from each other by providing, e.g., hysteresis. In addition, it is assumed that, after the eye approach is detected, the eye approach state is maintained until the eye separation is detected. It is assumed that, after the eye separation is detected, the non-eye approach state is maintained until the eye approach is detected. The system control unit 50 switches between display (display state) and non-display (non-display state) of each of the display unit 108 and the EVF 217 according to the state detected in the eye approach detection unit 118. Specifically, in the case where at least the photographing standby state is established and a switching setting of a display destination is automatic switching, the display destination is set to the display unit 108 during the non-eye approach and the display is turned ON, and the non-display of the EVF 217 is established. In addition, during the eye approach, the display destination is set to the EVF 217 and the display is turned ON, and the non-display of the display unit 108 is established. Note that the eye approach detection unit 118 is not limited to the infrared proximity sensor, and other sensors may be used as the eye approach detection unit 118 as long as the sensors can detect the state which can be regarded as the eye approach.

In addition, the camera 100 has the outside-viewfinder display unit 107, an outside-viewfinder display unit drive circuit 223, a power supply control unit 224, a power supply unit 225, a recording medium I/F 226, and an operation unit 228.

The outside-viewfinder display unit 107 is driven by the outside-viewfinder display unit drive circuit 223, and displays various set values of the camera 100 such as a shutter speed and an aperture. The power supply control unit 224 is constituted by a battery detection circuit, a DC-DC converter, and a switch circuit for switching between blocks to be energized, and performs detection of presence or absence of an attached battery, the type of the battery, and a remaining battery level. In addition, the power supply control unit 224 controls the DC-DC converter based on its detection result and an instruction of the system control unit 50, and supplies required voltage to individual units including the recording medium 227 for a required time period. Examples of the power supply unit 225 include primary batteries such as an alkaline battery and a lithium battery, secondary batteries such as an NiCd battery, an NiMH battery, and an Li battery, and an AC adaptor. The recording medium I/F 226 is an interface with the recording medium 227 such as a memory card or a hard disk. The recording medium 227 is a memory card for recording a photographed image, and is constituted by a semiconductor memory and a magnetic disk. The recording medium 227 may be attachable to and detachable from the camera 100 and may also be embedded in the camera 100.

The operation unit 228 is an input unit which receives operations from the user (user operations), and is used for inputting various instructions to the system control unit 50. The operation unit 228 includes the shutter button 101, the power switch 102, the mode switching switch 103, the touch panel 109, and other operation units 229. Other operation units 229 include the main electronic dial 104, the sub-electronic dial 105, the movie button 106, the direction key 110, the SET button 111, the AE lock button 112, the enlargement button 113, the playback button 114, the menu button 115, and the touch bar 119.

The shutter button 101 has a first shutter switch 230 and a second shutter switch 231. The first shutter switch 230 is turned ON at some midpoint of an operation of the shutter button 101 by what is called pressing halfway down (photographing preparation instruction), and outputs a first shutter switch signal SW1. The system control unit 50 starts photographing preparation processing such as AF processing, AE processing, AWB processing, and EF processing according to the first shutter switch signal SW1. The second shutter switch 231 is turned ON at the completion of the operation of the shutter button 101 by what is called pressing all the way down (photographing instruction), and outputs a second shutter switch signal SW2. The system control unit 50 starts a series of photographing processing steps from reading a signal from the imaging unit 211 to generating an image file including a photographed image and writing the image file into the recording medium 227 according to the second shutter switch signal SW2.

The mode switching switch 103 switches an operation mode of the system control unit 50 to any of a still image photographing mode, a movie shooting mode, and a playback mode. Modes included in the still image photographing mode include an auto photographing mode, an auto scene determination mode, a manual mode, an aperture priority mode (Av mode), a shutter speed propriety mode (Tv mode), and a program AE mode (P mode). In addition, various scene modes and custom modes serving as photographing settings for each photographing scene are also included. The user can directly switch the operation mode to any of the above-described photographing modes with the mode switching switch 103. Alternatively, the user can temporarily switch a screen to a list screen of the photographing modes with the mode switching switch 103 and then selectively switch the operation mode to any of a plurality of displayed modes by using the operation unit 228. Similarly, a plurality of modes may be included also in the movie shooting mode.

The touch panel 109 is a touch sensor which detects various touch operations to a display surface (an operation surface of the touch panel 109) of the display unit 108. The touch panel 109 and the display unit 108 can be constituted integrally with each other. For example, the touch panel 109 is mounted to an upper layer of the display surface of the display unit 108 such that the transmittance of light does not hinder the display of the display unit 108. Subsequently, input coordinates in the touch panel 109 are associated with display coordinates on the display surface of the display unit 108. With this, it is possible to configure a GUI (graphical user interface) which looks as if the user could directly operate a screen displayed on the display unit 108. As the touch panel 109, it is possible to use any of various methods such as a resistive film method, a capacitance method, a surface elastic wave method, an infrared method, an electromagnetic induction method, an image recognition method, and an optical sensor method. Depending on the method, there are a method which detects a touch with contact with the touch panel 109, and a method which detects the touch with approach of a finger or a pen to the touch panel 109, but any method may be adopted.

The system control unit 50 can detect the following operations to the touch panel 109 or the following states.

- an operation in which a finger or a pen which is not in contact with the touch panel 109 newly touches the touch panel 109, i.e., a start of a touch (hereinafter referred to as Touch-Down).
- a state in which the finger or the pen is in contact with the touch panel 109 (hereinafter referred to as Touch-On).
- an operation in which the finger or the pen is moving while being in contact with the touch panel 109 (hereinafter referred to as Touch-Move).
- an operation in which the finger or the pen which is in contact with the touch panel 109 is separated from (released from) the touch panel 109, i.e., an end of the touch (hereinafter referred to as Touch-Up).
- a state in which nothing is in contact with the touch panel 109 (hereinafter referred to as Touch-Off).

When the touch-down is detected, the touch-on is detected at the same time. After the touch-down, the touch-on is continuously detected usually as long as the touch-up is not detected. Also in the case where the touch-move is detected, the touch-on is detected at the same time. Even when the touch-on is detected, in the case where the touch position is not moved, the touch-move is not detected. After the touch-up of all fingers and pens having been in contact with the touch panel 109 is detected, the touch-off is established.

These operations and states and position coordinates of the touch of the finger or the pen on the touch panel 109 are reported to the system control unit 50 through an internal bus. The system control unit 50 determines the type of the operation (touch operation) performed on the touch panel 109 based on the reported information. With regard to the touch-move, it is possible to determine a movement direction of the finger or the pen which moves on the touch panel 109 for each vertical component and for each horizontal component on the touch panel 109 based on change of the position coordinates. In the case where the touch-move having a predetermined distance or longer is detected, it is determined that a slide operation has been performed. An operation in which a finger is swiftly moved by a certain distance while being in contact with the touch panel 109 and is separated is referred to as a flick. In other words, the flick is an operation in which the finger is swiftly slid on the touch panel 109 so as to flick the touch panel 109. When the touch-move having a predetermined distance or longer and a predetermined speed or higher is detected and the touch-up is then detected, it is determined that the flick has been performed (it is possible to determine that the flick has been performed subsequently to the slide operation). Further, a touch operation in which a plurality of locations (e.g., two locations) are touched at the same time (multi-touched) and touch positions are brought close to each other is referred to as a pinch-in, and a touch operation in which the touch positions are moved away from each other is referred to as a pinch-out. The pinch-out and the pinch-in are collectively referred to as a pinch operation (or simply referred to as a pinch).

Configuration of Lens Unit

Figures 3, 4A, 4B:
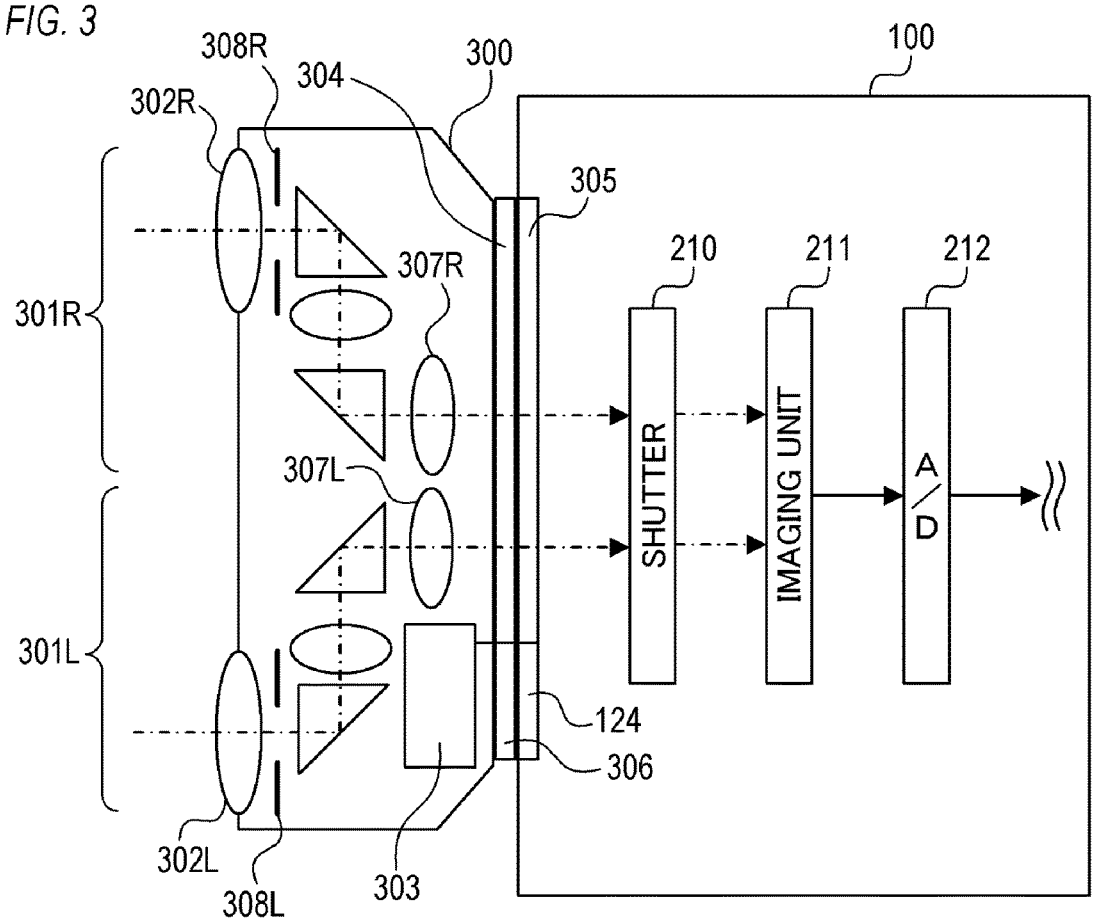
FIG. 3 is a schematic view showing a configuration of a lens unit.
FIGS. 4A and 4B are schematic views each showing part of a light-receiving surface of an image sensor.

FIG. 3 is a schematic view showing a configuration of the lens unit 300. FIG. 3 shows a state in which the lens unit 300 is attached to the camera 100. By attaching the lens unit 300, the camera 100 becomes able to capture one image (a still image or a movie) including two image areas having a predetermined parallax. Note that, in the camera 100 shown in FIG. 3, the same components as the components described in FIG. 2 are designated by the same reference numerals as those in FIG. 2, and the description of the components will be appropriately omitted.

The lens unit 300 is a type of an interchangeable-lens unit which is attachable to and detachable from the camera 100. The lens unit 300 is a dual-lens unit capable of capturing a right image and a left image having a parallax. The lens unit 300 has two optical systems, and each of the two optical systems can capture an area having a wide view angle of about 180 degrees. Specifically, each of the two optical systems of the lens unit 300 can image an object corresponding to a field of view (angle of view) of 180 degrees in a left-to-right direction (a horizontal angle, an azimuth angle, a yaw angle) and 180 degrees in an up-and-down direction (a vertical angle, an elevation angle, a pitch angle). That is, each of the two optical systems can capture a front hemispherical area.

The lens unit 300 has a right-eye optical system 301R having a plurality of lenses and a reflection mirror, a left-eye optical system 301L having a plurality of lenses and a reflection mirror, and a lens system control circuit 303. The right-eye optical system 301R has a lens 302R disposed on the side of the object, and the left-eye optical system 301L has a lens 302L disposed on the side of the object. The lens 302R and the lens 302L are directed in the same direction, and optical axes thereof are substantially parallel to each other.

The lens unit 300 is a dual-lens unit (VR180 lens unit) for obtaining an image of VR180 which is one of formats of a VR (Virtual Reality) image capable of binocular stereoscopic vision. The lens unit 300 has a fish-eye lens capable of capturing an area of about 180 degrees in each of the right-eye optical system 301R and the left-eye optical system 301L. Note that the area which can be captured by the lens of each of the right-eye optical system 301R and the left-eye optical system 301L may be an area of about 160 degrees which is narrower than the area of 180 degrees. The lens unit 300 can form the right image formed via the right-eye optical system 301R and the left image formed via the left-eye optical system 301L on one imaging element of the camera to which the lens unit 300 is attached.

The lens unit 300 is attached to the camera 100 via a lens mount portion 304, and a camera mount portion 305 of the camera 100. With this, the system control unit 50 of the camera 100 and the lens system control circuit 303 of the lens unit 300 are electrically connected to each other via the communication terminal 124 of the camera 100 and the communication terminal 306 of the lens unit 300.

In FIG. 3, the right image formed via the right-eye optical system 301R and the left image formed via the left-eye optical system 301L are formed side by side in the imaging unit 211 of the camera 100. That is, by the right-eye optical system 301R and the left-eye optical system 301L, two optical images are formed in two areas of one imaging element (imaging sensor). The imaging unit 211 converts the formed object image (optical signal) to an analog electrical signal. Thus, by using the lens unit 300, it is possible to acquire one image including two image areas having a parallax from two locations (optical systems) which are the right-eye optical system 301R and the left-eye optical system 301L. By dividing the acquired image into an image for the left eye and an image for the right eye and performing VR display of the images, the user can view a three-dimensional VR image having an area of about 180 degrees. That is, the user can stereoscopically view the image of VR180.

In Embodiment 1, it is assumed that the configurations of the right-eye optical system 301R and the left-eye optical system 301L are identical to each other. With this, it is possible to simplify arithmetic calculation described later. Note that the configurations of the right-eye optical system 301R and the left-eye optical system 301L may be different from each other.

When the user performs photographing, the user can perform focus adjustment of the right image and the left image by driving a focus adjustment optical system 307R and a focus adjustment optical system 307L serving as focus adjustment units while checking the image obtained in the imaging unit 211 in the display unit 108 (or the EVF 217). The user can adjust the focus of the right image by driving the focus adjustment optical system 307R, and can adjust the focus of the left image by driving the focus adjustment optical system 307L. It is possible to drive the focus adjustment optical system 307R and the focus adjustment optical system 307L with a binocular focusing ring mechanism which drives both of the focus adjustment optical system 307R and the focus adjustment optical system 307L simultaneously. In addition, it is also possible to drive the focus adjustment optical system 307R and the focus adjustment optical system 307L with a monocular focusing ring mechanism which drives only one of the focus adjustment optical system 307R and the focus adjustment optical system 307L. For example, in photographing having a deep depth of field, only the focus adjustment by the binocular focusing ring mechanism is performed. In photographing having a shallow depth of field, after the focus adjustment by the binocular focusing ring mechanism is performed, the focus adjustment by the monocular focusing ring mechanism is further performed such that an image in sharper focus is obtained. The focus adjustment may be performed by operating an operation ring (not shown) provided on the exterior of the lens unit 300, and may also be performed by operating the camera 100. In the case where the camera 100 is operated, an instruction is sent to the lens system control circuit 303 of the lens unit 300 from the system control unit 50 of the camera 100. Subsequently, the lens system control circuit 303 electronically drives the focus adjustment optical system 307R and the focus adjustment optical system 307L.

In addition, when the user performs photographing, the user can perform exposure adjustment of the right image and the left image by driving a variable diaphragm 308R of the right-eye optical system 301R and a variable diaphragm 308L of the left-eye optical system 301L. The user can adjust the exposure of the right image by driving the variable diaphragm 308R, and can adjust the exposure of the left image by driving the variable diaphragm 308L. It is possible to drive the variable diaphragm 308R and the variable diaphragm 308L with a binocular diaphragm adjustment mechanism which drives both of the variable diaphragm 308R and the variable diaphragm 308L simultaneously. In addition, it is also possible to drive the variable diaphragm 308R and the variable diaphragm 308L with a monocular diaphragm adjustment mechanism which drives only one of the variable diaphragm 308R and the variable diaphragm 308L.

Imaging Surface Phase Difference Detection

In the imaging unit 211, in order to allow imaging surface phase difference AF, each of a plurality of pixel units arranged in an array holds two photodiodes which are photoelectric conversion units (light-receiving units) for one microlens. With this, each pixel unit can divide an exit pupil of the lens unit 300 to receive a light flux.

Each of FIGS. 4A and 4B is a schematic view showing part of a light-receiving surface of an image sensor. FIG. 4A shows part of the light-receiving surface of the image sensor as a reference example, and FIG. 4B shows part of the light-receiving surface of the imaging unit 211. In FIG. 4A, color filters of red (R), blue (B), and green (Gb, Gr) are arranged in a Bayer array. In FIG. 4B, the array of color filters is similar to that in FIG. 4A, and each pixel unit holds two photodiodes for one microlens.

The image sensor having the configuration shown in FIG. 4B is configured to be able to output two signals for phase difference detection (an A image signal and a B image signal) from each pixel unit. In addition, the image sensor is configured to be able to output a signal for imaging (the A image signal+the B image signal) obtained by adding together signals of two photodiodes. As the signal obtained by the addition, a signal equivalent to an output of the image sensor shown in FIG. 4A is output.

A distance measurement unit which is not shown executes distance measurement calculation by using an output signal from the imaging unit 211 described above, and outputs its result to the system control unit 50. For example, the distance measurement unit performs correlation calculation of two image signals, and calculates information such as a defocus amount and various reliability. The distance measurement unit calculates the defocus amount on an image surface based on a displacement between the A image signal and the B image signal. It is possible to determine whether focus is front focus or rear focus according to whether the defocus amount has a positive value or a negative value. In addition, it is possible to determine a degree up to focus according to an absolute value of the defocus amount, and focus is achieved when the defocus amount is zero. The distance measurement unit outputs, to the system control unit 50 or the like, information indicating that the focus is front focus or rear focus based on whether the value of the defocus amount calculated for a distance measurement position (a distance measurement area, a focus detection portion, a focus detection area) is positive or negative. In addition, the distance measurement unit outputs in-focus degree information indicative of an in-focus degree (out-of-focus degree of focus) to the system control unit 50 or the like based on the absolute value of the defocus amount. Information indicating that the focus is front focus or rear focus is output in the case where the defocus amount exceeds a predetermined value, and information indicating that focus is achieved is output in the case where the absolute value of the defocus amount is not more than a predetermined value. Note that, as the in-focus degree information, the defocus amount is converted to a rotation amount (operation amount) of the binocular focusing ring mechanism or the monocular focusing ring mechanism required for achieving focus and the rotation amount is output.

Note that, in Embodiment 1, it is assumed that the imaging unit 211 outputs three signals including a signal for imaging and two image signals for phase difference detection, but the present invention is not limited thereto. For example, the imaging unit 211 may output two signals out of the three signals. In this case, the remaining one signal is calculated by using the two signals from the imaging unit 211.

Note that, in Embodiment 1, it is assumed that each pixel unit holds two photodiodes for one microlens, but the present invention is not limited thereto. Each pixel unit may hold three or more photodiodes for one microlens. In addition, the imaging unit 211 may have a plurality of the pixel units having different opening positions of the light-receiving units for the microlenses. The configuration of the imaging unit 211 is not particularly limited as long as two signals for phase difference detection such as the A image signal and the B image signal are obtained.

Indicator Function

A description will be given of display forms of indicators (a guide item, a display item) according to Embodiment 1 by using FIGS. 5A to 5E. The indicator includes, e.g., a focus guide (a frame which assists focus adjustment) and a face frame.

In Embodiment 1, the focus guide is displayed so as to be superimposed on a live image (live image area). The focus guide indicates a focus state (in-focus degree) at a display position of the focus guide (an area indicated by a focus frame described later). For example, based on the defocus amount acquired for the display position of the focus guide, the focus state at the display position is indicated. More specifically, the focus state is indicated by using the defocus amount calculated based on output values from, among a plurality of pixels which is arranged in the imaging unit 211 and at which the defocus amounts can be acquired, one or more pixels in an area corresponding to the display position of the focus guide. The pixel at which the defocus amount can be acquired can be viewed as a pixel which allows imaging surface phase difference detection. Thus, the focus guide indicates information related to the focus of, among objects shown in the live image, an object shown at the display position of the focus guide.

Figure 5A:
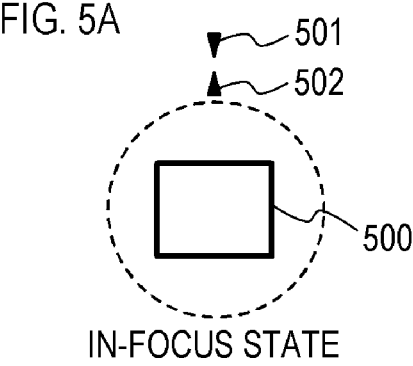
FIGS. 5A to 5E are schematic views showing display forms of indicators.

FIG. 5A shows a first display form of the indicator. The indicator in FIG. 5A is a focus guide (a main guide described later), and includes a focus frame 500 and display parts 501 and 502. FIG. 5A shows a state in which it is determined that the object indicated by the focus frame 500 is in focus. In the state in which it is determined that the object is in focus, the outer display part 501 and the inner display part 502 are displayed in the same direction with respect to the focus frame 500. In FIG. 5A, the display parts 501 and 502 are stopped above the focus frame 500. By the display parts 501 and 502 described above, it is indicated that the object indicated by the focus frame 500 is in focus. The display parts 501 and 502 may be displayed in a color (e.g., green) different from the color (e.g., white or gray) of the display part in each of other states. The display part 501 is one display part in which two display parts 507 and 508 described later are integrated. The display part 502 is one display part in which two display parts 504 and 505 described later are integrated.

Figure 5B:
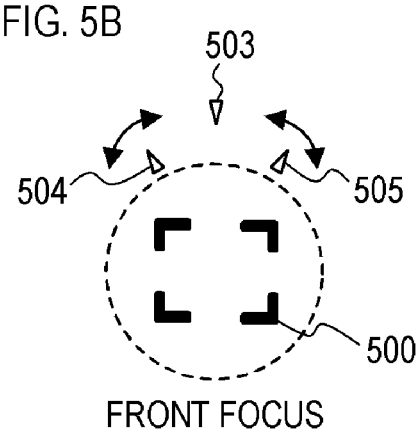
Figure 5C:
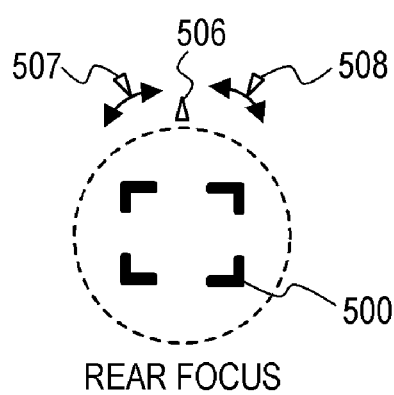

FIG. 5B shows a second display form of the indicator, and FIG. 5C shows a third display form of the indicator. The indicator in each of FIGS. 5B and 5C is a focus guide. Each of FIGS. 5B and 5C shows a state in which it is determined that while the object indicated by the focus frame 500 is not in focus, and the reliability of a focus detection result is high. I this case, the focus guide indicates the focus position and the defocus amount. The presentation of the focus position and the defocus amount can be viewed as the presentation of an adjustment direction and an adjustment amount of the focus position for bringing the object indicated by the focus frame 500 into focus.

FIG. 5B shows a front focus state in which a near side relative to the object is in focus. In FIG. 5B, while an outer display part 503 is stopped above the focus frame 500 similarly to the display part 501 in FIG. 5A, the display part 502 in FIG. 5A is separated into two display parts and the display parts 504 and 505 appear. The display parts 504 and 505 move along a circle which surrounds the focus frame 500, and are disposed so as to be bilaterally symmetric with respect to the position of the display part 502 in FIG. 5A. The separation of the display part 502 into the display parts 504 and 505 means front focus, and a distance between the display part 504 and the display part 505 denotes the defocus amount. As the magnitude (absolute value) of the defocus amount is larger, the display part 504 and the display part 505 are moved farther away from the position of the display part 503 (reference position), and a distance between the display part 504 and the display part 505 is longer. The display parts 504 and 505 are displayed in, e.g., white.

FIG. 5C shows a rear focus state in which an infinity side relative to the object is in focus. In FIG. 5C, while an inner display part 506 is stopped above the focus frame 500 similarly to the display part 502 in FIG. 5A, the display part 501 in FIG. 5A is separated into two display parts and the display parts 507 and 508 appear. The display parts 507 and 508 move along a circle which surrounds the focus frame 500, and are disposed so as to be bilaterally symmetric with respect to the position of the display part 501 in FIG. 5A. The separation of the display part 501 into the display parts 507 and 508 means rear focus, and a distance between the display part 507 and the display part 508 denotes the defocus amount. As the magnitude (absolute value) of the defocus amount is larger, the display part 507 and the display part 508 are moved farther away from the position of the display part 506 (reference position), and a distance between the display part 507 and the display part 508 is longer. The display parts 507 and 508 are displayed in, e.g., white.

Thus, in FIGS. 5B and 5C, the focus position and the adjustment direction of the focus position are indicated by which one of the display part 501 and the display part 502 in FIG. 5A is separated into two. In addition, the defocus amount and the adjustment amount of the focus position are indicated by the distance between the two display parts obtained by the separation.

Figure 5D:
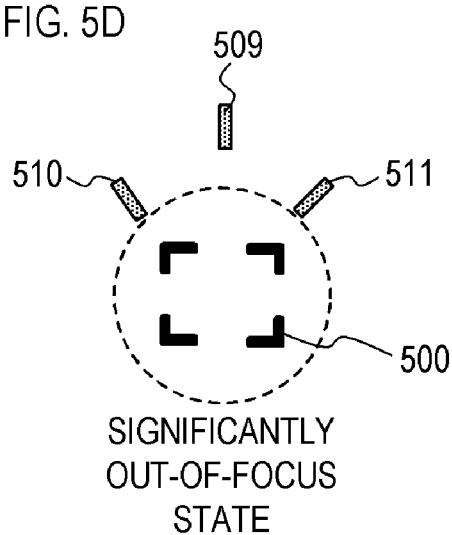

FIG. 5D shows a fourth display form of the indicator. The indicator in FIG. 5D is a focus guide, and includes the focus frame 500 and display parts 509 to 511. FIG. 5D shows a significantly out-of-focus state having low reliability of the focus detection result. The display parts 509 to 511 are displayed in a mode different from the mode of the display part in each of other states. In FIG. 5D, the display parts 509 to 511 are displayed in a color (e.g., gray) different from the color (e.g., white or green) of the display part in each of other states. In addition, the positions of the display parts 509 to 511 with respect to the focus frame 500 are fixed to predetermined positions. Further, each of the display parts 509 to 511 is displayed in a shape (e.g., a rectangle) different from the shape (e.g., a triangle) of the display part in each of other states. By the display parts 509 to 511 described above, the focus position and the defocus amount are not indicated and it is indicated that the focus detection is not completed (the reliability of the focus detection result is low).

Figure 5E:
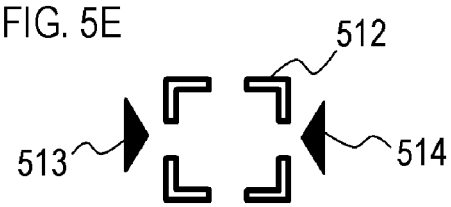

FIG. 5E shows a fifth display form of the indicator. The indicator in FIG. 5E includes a face frame 512 (face detection frame). Face detection is processing in which an image captured in the imaging unit 211 (a live image or the like) is analyzed and a face of a specific object (e.g., a person) is thereby detected from the image. For example, filtering with an edge detection filter or a noise removal filter is performed on an input image obtained in the image processing unit 214. Subsequently, by performing pattern matching on the image after the filtering processing, a candidate group of parts such as a pupil, a nose, a mouth, and an ear is extracted. Then, characteristic values of detection reliability, a distance between the parts, and pair information (a pupil, an ear) are calculated from the candidate group, and an area corresponding to a face is determined based on the characteristic values. Programs for the pattern matching and the filtering are pre-stored in the non-volatile memory 219, and the programs are loaded into the system memory 218 on an as needed basis and executed by the system control unit 50. A dedicated circuit for performing face detection may also be prepared. The face frame 512 is disposed so as to be superimposed on the live image such that the face is indicated.

Note that the display form of the indicator is not limited to the display forms shown in FIGS. 5A to 5E. In addition, the description has been given of the example in which the focus state (in-focus degree) is determined from the defocus amount calculated based on the signal (imaging surface phase difference signal) obtained from the imaging unit 211, but the determination method of the focus state is not limited thereto. The focus state may be determined based on an output value from a focus detection sensor (phase difference sensor or the like) provided at a place different from the imaging surface, and the focus state may also be determined based on a contrast value of a captured image.

A plurality of the focus guides may be displayed for one live image (live image area). For example, for the live image, a focus guide (main guide) which is a focus adjustment target and a focus guide (sub-guide) which is not the focus adjustment target may be displayed. As described above, the main guide includes the focus frame (main frame; focus frame 500), and the display parts (display parts 501, 502, 504, 505, 507, 508, and 509 to 511) indicative of the focus state. The sub-guide is a focus guide of a type different from the main guide, and the sub-guide includes the focus frame (sub-frame) but does not include the display part indicative of the focus state. It may be possible to switch between the main frame and the sub-frame with the touch operation (e.g., a tap) to the touch panel 109 and an operation to the direction key 110. It may be possible to switch between the presence and the absence of the sub-frame with a menu screen.

Similarly, with regard to the face frame 512 in FIG. 5E, a plurality of the face frames 512 may be displayed for one live image (live image area). In this case, display parts 513 and 514 are displayed for, among a plurality of the face frames 512, the face frame 512 (main frame) serving as a processing target, and the main frame is distinguished from the face frame 512 (sub-frame) which is not the processing target. The indicator including the face frame 512 (main frame) and the display parts 513 and 514 can be viewed as the indicator of a type different from the indicator which includes the face frame 512 (sub-frame) but does not include the display parts 513 and 514. For the main frame, more display parts indicative of the focus state may be displayed. It may be possible to switch between the main frame and the sub-frame with the touch operation (e.g., the tap) to the touch panel 109 and the operation to the direction key 110.

The user may be able to switch between the presence and the absence of the sub-frame with the menu screen.

Indicator Operation

Figure 6A:
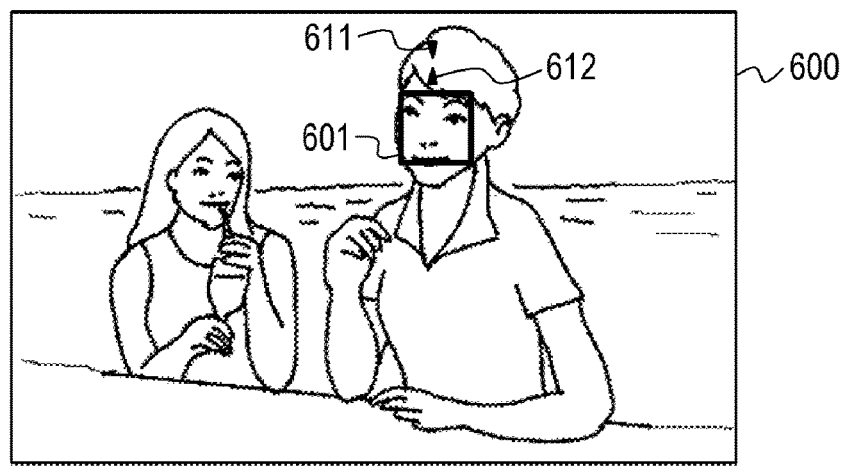
FIGS. 6A to 6C are views for explaining an indicator operation according to Embodiment 1.
Figure 6B:
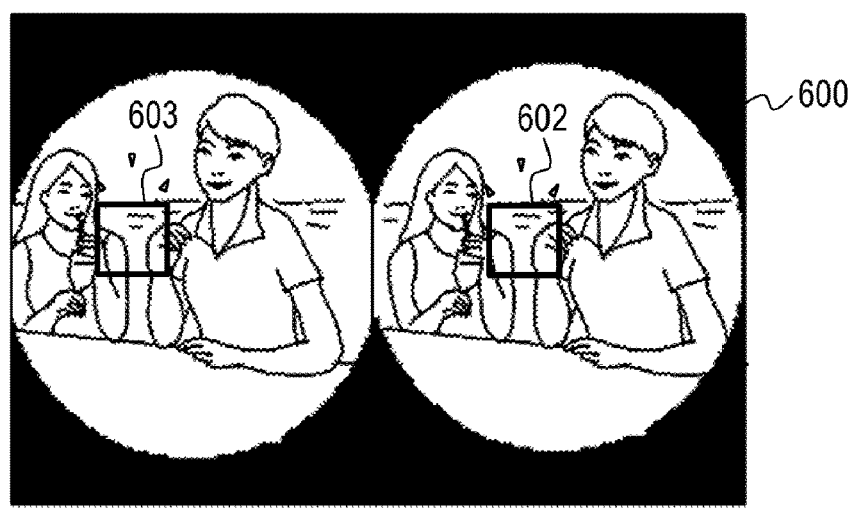
Figure 6C:
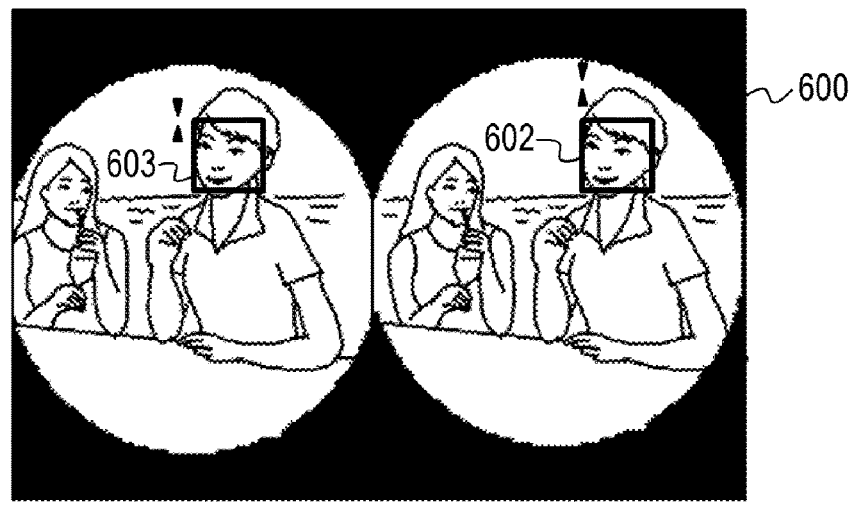

A description will be given of an indicator operation according to Embodiment 1, and an operation corresponding to the indicator operation by using FIGS. 6A to 6C. FIG. 6A shows a live image 600 displayed in the display unit 108 (or the EVF 217) in a state in which the lens unit 200 (single-lens unit) is attached to the camera 100. In FIG. 6A, a focus frame 601 and display parts 611 and 612 indicative of the focus state are displayed so as to be superimposed on the live image 600. Various pieces of information such as an imaging parameter, the number of recorded images, and a remaining battery level may be displayed so as to be superimposed on a peripheral edge portion of the live image 600.

It is assumed that, in the state in FIG. 6A, lens exchange is performed and the lens unit 300 (dual-lens unit) is attached to the camera 100. Consequently, as shown in FIG. 6B, in the live image 600, an image area (live image area) captured vie the left-eye optical system 301L and an image area (live image area) captured via the right-eye optical system 301R are displayed so as to be arranged in a left-to-right direction. In addition, in Embodiment 1, as shown in FIG. 6B, by executing indicator display processing 800 described later, a focus frame 602 is displayed so as to be superimposed on the right live image area, and a focus frame 603 is displayed so as to be superimposed on the left live image area. Although the detail thereof will be described later, the focus frame 602 and the focus frame 603 are displayed so as to correspond to each other. In addition, the display parts indicative of the focus state are displayed for each of the focus frames 602 and 603. Further, as shown in FIG. 6C, when the focus frame 602 is moved by the touch operation (e.g., the touch-move) to the touch panel 109, the focus frame 603 is also moved in synchronization with the movement of the focus frame 602.

As another method, it is conceivable to adopt a method in which the user sets the focus frames in the left and right live image areas individually and moves the focus frames individually. However, it is troublesome for the user to set the focus frames in the left and right live image areas individually and move a plurality of the focus frames individually, and operation time is increased. According to the above method according to Embodiment 1, the focus frame is automatically displayed in each of the left and right live image areas. In addition, the user can move a plurality of the focus frames at the same time (with one operation). Accordingly, it is possible to save the time and effort of the user and shorten the operation time.

Figure 7A:
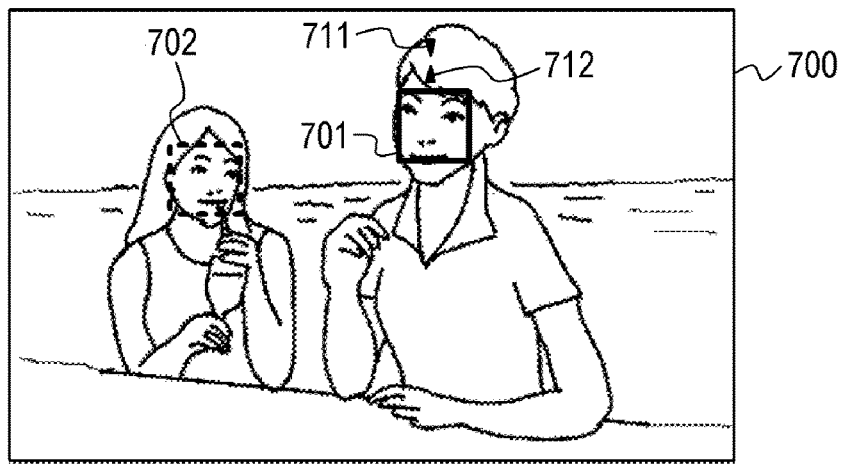
FIGS. 7A to 7C are views for explaining the indicator operation according to Embodiment 1.

As described above, with regard to the focus guide, a plurality of the focus guides may be displayed for one live image (live image area). Such a case will be described by using FIGS. 7A to 7C. FIG. 7A shows a live image 700 displayed in the display unit 108 (or the EVF 217) in the state in which the lens unit 200 (single-lens unit) is attached to the camera 100. In FIG. 7A, as the focus frames, a main frame 701 and a sub-frame 702 are displayed so as to be superimposed on the live image 700. Display parts 711 and 712 indicative of the focus state are displayed for the main frame 701. It is possible to switch between the main frame and the sub-frame. For example, it is possible to switch the focus frame from the main frame to the sub-frame and switch the focus frame from the sub-frame to the main frame by touching the main frame or the sub-frame. It may be possible to switch between the main frame and the sub-frame with an operation to the direction key 110. With this, it becomes possible to perform AF operations at a plurality of locations quickly while switching between the AF operations.

Figure 7B:
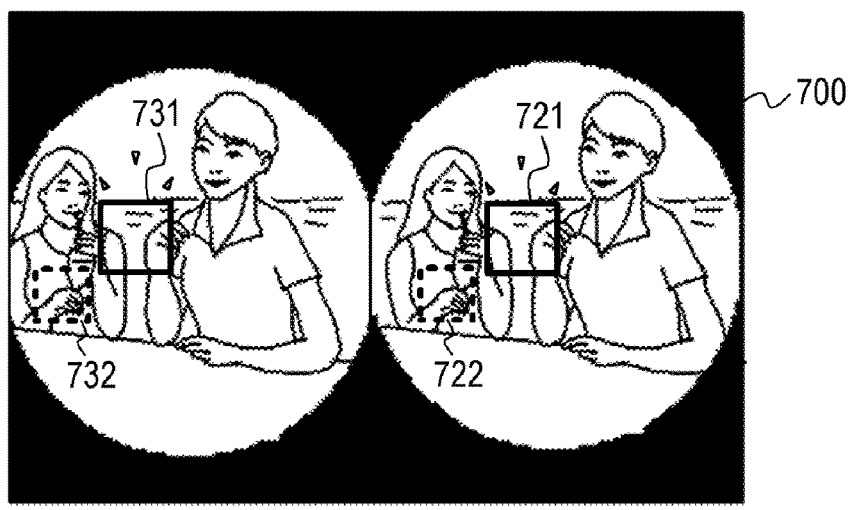
Figure 7C:
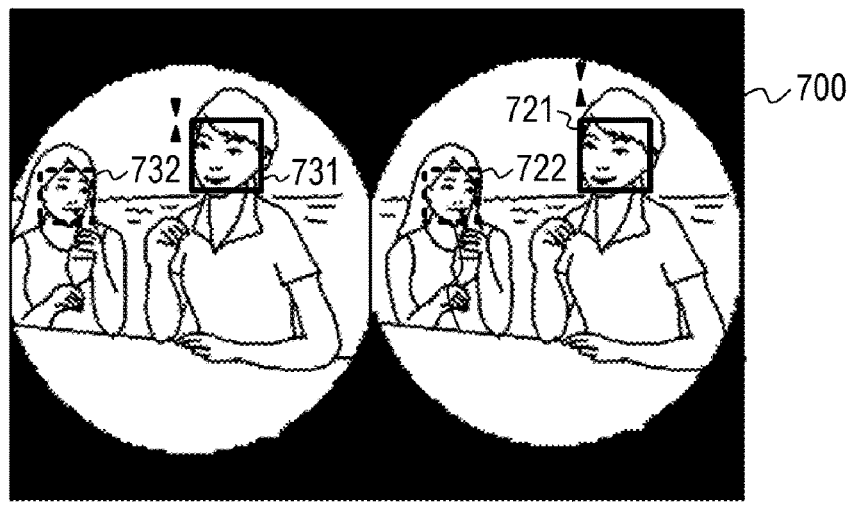

It is assumed that lens exchange is performed in the state in FIG. 7A and the lens unit 300 (dual-lens unit) is attached to the camera 100. Consequently, as shown in FIG. 7B, in the live image 700, the image area (live image area) captured via the left-eye optical system 301L and the image area (live image area) captured via the right-eye optical system 301R are displayed so as to be arranged in the left-to-right direction. Subsequently, in Embodiment 1, the indicator display processing 800 described later is executed. With this, as shown in FIG. 7B, a main frame 721 and a sub-frame 722 are displayed so as to be superimposed on the right live image area, and a main frame 731 and a sub-frame 732 are displayed so as to be superimposed on the left live image area. Although the detail thereof will be described later, the main frame 721 and the main frame 731 are displayed so as to correspond to each other, and the sub-frame 722 and the sub-frame 732 are displayed so as to correspond to each other. In addition, the display parts indicative of the focus state are displayed for each of the main frames 721 and 731. As shown in FIG. 7C, when the main frame 721 is moved by the touch operation (e.g., the touch-move) to the touch panel 109, the main frame 731 is also moved in synchronization with the movement of the main frame 721. Similarly, when the sub-frame 722 is moved, the sub-frame 732 is also moved in synchronization with the movement of the sub-frame 722. With this, it is possible to save the time and effort of the user and shorten the operation time.

Note that the state of the indicator (color, a line type, or the like) may be made different according to whether or not an operation related to the indicator is performed. For example, in the case where the drive of the monocular focusing ring mechanism of the right-eye optical system 301R is detected, the color of the indicator displayed in the right live image area may be controlled (changed) to a specific color. In addition, in the case where the drive of the binocular focusing ring mechanism is detected, the color of the indicator displayed in the left live image area may be controlled (changed) to a specific color. With this, it becomes possible to easily grasp the focus adjustment performed by the user himself/herself, and the focus adjustment is facilitated. The indicator of which the color is controlled may be only the main indicator (the main guide) or the indicators thereof may also be both of the main indicator and the sub-indicator (the main guide and the sub-guide).

In addition, in the case where the drive of the monocular focusing ring mechanism of the left-eye optical system 301L is detected, the color of the indicator displayed in the left live image area may be controlled (changed) to a specific color. In this case as well, in the case where the drive of the monocular focusing ring mechanism of the right-eye optical system 301R is detected, the color of the indicator displayed in the right live image area may be controlled (changed) to a specific color. Further, in the case where the drive of the binocular focusing ring mechanism is detected, the colors of the indicators displayed in both of the left and right live image areas may be controlled (changed) to a specific color. Also with this, it becomes possible to easily grasp the focus adjustment performed by the user himself/herself, and the focus adjustment is facilitated.

Indicator Display Processing

Figure 8A:
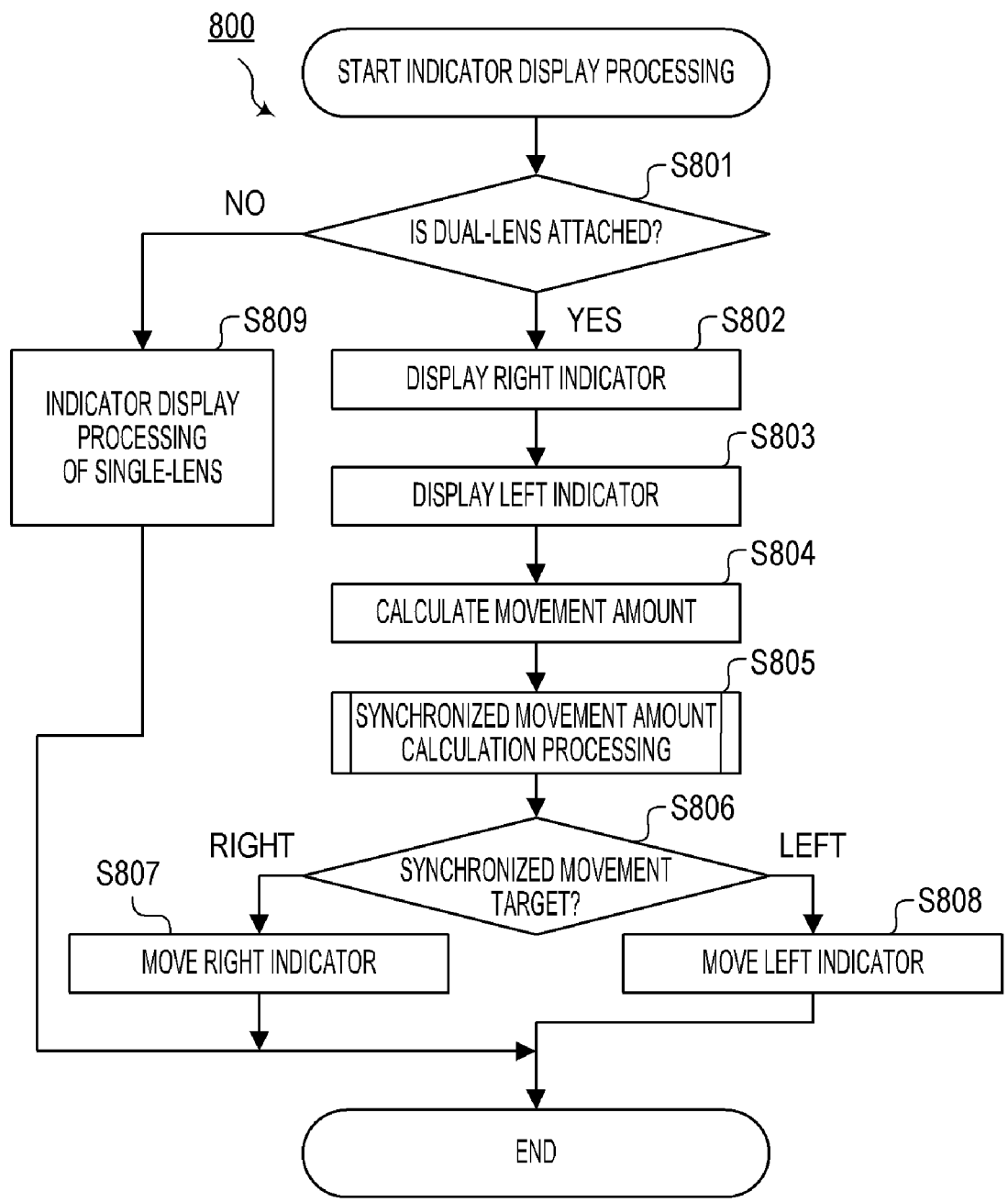
FIG. 8A is a flowchart showing indicator display processing according to Embodiment 1.

FIG. 8A is a flowchart showing an operation (an operation related to indicator display, indicator display processing 800) of the camera 100 at the time of the photographing mode such as the still image photographing mode or the movie shooting mode. This operation is implemented by loading a program recorded in the non-volatile memory 219 into the system memory 218 and executing the program by the system control unit 50. For example, when the camera 100 is activated in the photographing mode or the mode of the camera 100 is switched to the photographing mode, the operation in FIG. 8A is started. In the following description, it is assumed that the display in the display unit 108 is performed, but the following display may be performed in the EVF 217.

In Step S801, the system control unit 50 identifies lens information received in the communication terminal 206, and identifies (determines) the attachment state of the lens unit in the camera 100. In the case where it is determined that the single-lens unit (lens unit 200) is attached to the camera 100 or the lens unit is not attached to the camera 100, the processing proceeds to Step S809. Otherwise (in the case where it is determined that the dual-lens unit (lens unit 300) is attached to the camera 100), the processing proceeds to Step S802.

In Step S809, the system control unit 50 executes the indicator display processing of the single-lens unit. For example, the focus frame 601 in FIG. 6A and the main frame 701 and the sub-frame 702 in FIG. 7A are displayed so as to be superimposed on the live image obtained by using the single-lens unit. The display part indicative of the focus state is also displayed for the main frame. In the case where the lens unit is not attached to the camera 100, the live image is not displayed, and hence the indicator (the focus frame or the display part) is also not displayed.

As described above, the live image obtained by using the dual-lens unit includes two live image areas arranged in the left-to-right direction. In Step S802, the system control unit 50 displays the indicator in the right live image area. For example, the focus frame 602 in FIG. 6B and the main frame 721 and the sub-frame 722 in FIG. 7B are displayed to as to be superimposed on the right live image area. The display part indicative of the focus state is also displayed for the main frame.

In Step S803, the system control unit 50 displays the indicator in the left live image area. For example, the focus frame 603 in FIG. 6B and the main frame 731 and the sub-frame 732 in FIG. 7B are displayed so as to be superimposed on the left live image area. The display part indicative of the focus state is also displayed for the main frame. The indicator is displayed in the left live image area so as to correspond to the indicator displayed in the right live image area. A determination method of the display position of the indicator displayed in the left live image area will be described later.

Note that the indicator is displayed in the right live image area and the indicator is displayed in the left live image area so as to correspond to the indicator displayed in the right live image area, but the present embodiment is not limited thereto. For example, the indicator may be displayed in the left live image area and the indicator may be displayed in the right live image area so as to correspond to the indicator displayed in the left live image area.

In Step S804, the system control unit 50 waits for an instruction from the user, and calculates a movement amount of the indicator in the right live image area or the left live image area according to the instruction (e.g., the touch-move to the touch panel 109) from the user. For example, when the indicator is touched by a finger and the touch-move is performed, the movement amount of the finger (touch position) in the touch-move is calculated as the movement amount of the touched indicator.

In Step S805, the system control unit 50 performs synchronized movement amount calculation processing. The synchronized movement amount calculation processing calculates a synchronized movement amount when the indicator in the other one of the right and left live image areas is moved in synchronization with the movement of the indicator (the indicator of which the movement amount is calculated in Step S804) in one of the right and left live image areas. The synchronized movement amount calculation processing will be described later by using FIGS. 8B and 8C. The indicator of which the movement amount is calculated in Step S804 can be viewed as the indicator specified by the user.

Step S806 is a step in which the system control unit 50 identifies the indicator serving as a synchronized movement target (the indicator which is moved in synchronization). The indicator on an opposite side which corresponds to the indicator (the indicator specified by the user) of which the movement amount is calculated in Step S804 is selected. For example, in the case where the user specifies the indicator in the right live image area and the movement amount of the indicator in the right live image area is calculated in Step S804, the indicator in the left live image area is selected as the synchronized movement target. Similarly, in the case where the user specifies the indicator in the left live image area and the movement amount of the indicator in the left live image area is calculated in Step S804, the indicator in the right live image area is selected as the synchronized movement target. In the case where the indicator in the right live image area is selected as the synchronized movement target, the processing proceeds to Step S807. Otherwise (in the case where the indicator in the left live image area is selected as the synchronized movement target), the processing proceeds to Step S808.

In Step S807, the system control unit 50 moves the indicator in the right live image area with the synchronized movement amount calculated in Step S805. In Step S808, the system control unit 50 moves the indicator in the left live image area with the synchronized movement amount calculated in Step S805.

Synchronized Movement Amount Calculation Processing of Indicator

The synchronized movement amount calculation processing (Step S805 in FIG. 8A) of the indicator will be described. FIG. 8B is a flowchart of synchronized movement amount calculation processing 820. Herein, a description will be given of an example in which the user moves the indicator (left indicator) in the left live image area and the indicator (right indicator) in the right live image area is moved in synchronization, but the movement of the indicator may be the other way around.

In Step S821, the system control unit 50 moves the left indicator with the movement amount (movement vector) calculated in Step S804, and acquires the display position after the movement of the left indicator. As a coordinate of the display position, for example, a coordinate with the center of the left live image area serving as the origin is obtained.

In Step S822, the system control unit 50 acquires various pieces of information required to calculate the display position after the movement of the right indicator. For example, the system control unit 50 converts the display position (the position on the live image) of the left indicator to an imaging position (a position on the imaging unit 211 (on the imaging element)). As a coordinate of the imaging position, for example, a coordinate X_L with an optical axis position of the left-eye optical system 301L serving as the origin is obtained. The system control unit 50 also acquires a (common) focal length f of the left-eye optical system 301L and the right-eye optical system 301R. The system control unit 50 also acquires a distance G (object distance) from the object indicated by the left indicator to the left-eye optical system 301L or the right-eye optical system 301R, and a distance L (optical axis distance L) between the optical axis of the right-eye optical system 301R and the optical axis of the left-eye optical system 301L. The focal length f and the optical axis distance L are predetermined, and the object distance G is measured by the distance measurement unit of the imaging unit 211.

In Step S823, the system control unit 50 calculates the display position after the movement of the right indicator, and calculates the movement amount (vector amount) from the display position before the movement to the display position after the movement as the synchronized movement amount.

Figure 9:
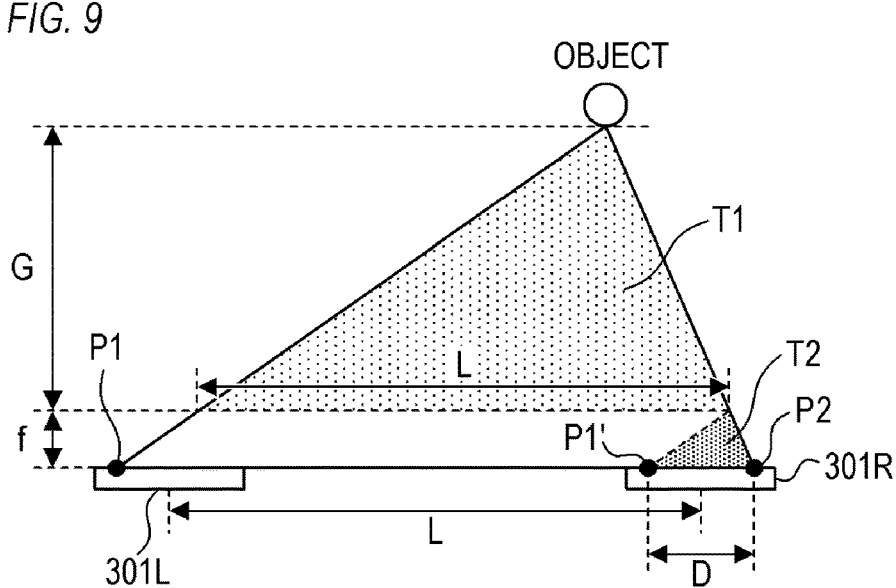
FIG. 9 is a schematic view showing a relationship between left and right imaging positions.

FIG. 9 shows a relationship between an imaging position P1 of the object in the case where the left-eye optical system 301L is used and an imaging position P2 of the object in the case where the right-eye optical system 301R is used. In FIG. 9, the focal length f, the object distance G, and the optical axis distance L are shown. A coordinate of an imaging position P1' in the case where the optical axis position of the right-eye optical system 301R is used as the origin is identical to a coordinate of the imaging position P1 in the case where the optical axis position of the left-eye optical system 301L is used as the origin. At this point, a triangle T1 is similar to a triangle T2, and hence, when it is assumed that a distance from the imaging position P1' to the imaging position P2 is D, the following Formula 1 is satisfied.

$$G=(L \times f)/D \qquad \text{(Formula 1)}$$

When it is assumed that a coordinate of the imaging position corresponding to the display position after the movement of the right indicator (a coordinate with the optical axis position of the right-eye optical system 301R serving as the origin) is X_R, a difference (X_R−X_L) between the coordinate X_R and the coordinate X_L corresponds to the above-described distance D. Accordingly, the system control unit 50 can calculate the coordinate X_R by using the following Formula 2. Subsequently, the system control unit 50 can determine the display position after the movement of the right indicator from the calculated coordinate X_R. As the coordinate of the display position, for example, a coordinate with the center of the right live image area serving as the origin is obtained.

$$X\_R=X\_L+(L \times f)/G \qquad \text{(Formula 2)}$$

According to the synchronized movement amount calculation processing 820, the left and right indicators (the left indicator and the right indicator) can be associated with each other more accurately. For example, the object captured by the left indicator can be captured by the right indicator more reliably. Note that, in the case where a coordinate outside the right live image area is calculated as the coordinate X_R, the color of the left indicator or the right indicator may be changed, or a pop-up warning may be displayed in the display unit 108. Note that, also in Step S803 in FIG. 8A, the display position of the left indicator can be determined by the same method as the above-described method.

Figure 8C:
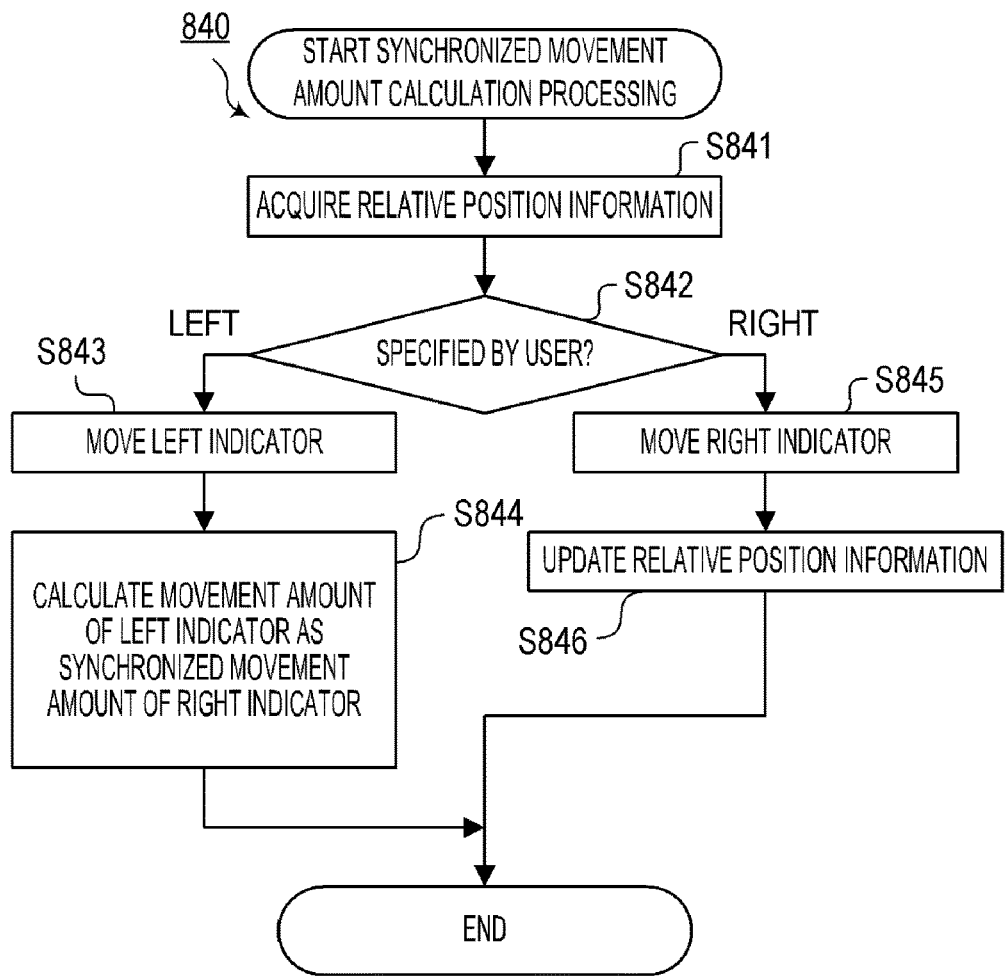

Another example of the synchronized movement amount calculation processing (Step S805 in FIG. 8A) will be described. FIG. 8C is a flowchart of synchronized movement amount calculation processing 840. In Step S803 in FIG. 8A, for example, it is assumed that the display position of the left indicator is determined such that a coordinate of the right indicator with the center of the right live image area serving as the origin matches a coordinate of the left indicator with the center of the left live image area serving as the origin. This processing can also be viewed as processing of determining the display position of the left indicator such that the relative position of the right indicator with respect to the right live image area matches the relative position of the left indicator with respect to the left live image area. In this case, if the right indicator is displayed at the center of the right live image area in Step S802, the left indicator is displayed at the center pf the left live image area in Step S803.

In Step S841, the system control unit 50 acquires information (relative position information) on a relative positional relationship between the left and right indicators. For example, the relative position information is generated from the display position of the left indicator and the display position of the right indicator. The generated relative position information may be stored in the system memory 218, and may be read from the system memory 218 and used at the time of the next processing. The relative position information is, e.g., the vector amount from one of the left and right indicators toward the other one of the left and right indicators.

In Step S842, the system control unit 50 determines whether the indicator (the indicator specified by the user) of which the movement amount is calculated in Step S804 in FIG. 8A is the right indicator or the left indicator. The processing proceeds to Step S843 in the case where it is determined that the corresponding indicator is the left indicator, and the processing proceeds to Step S845 in the case where it is determined that the corresponding indicator is the right indicator.

In Step S843, the system control unit 50 moves the left indicator with the movement amount (vector amount) calculated in Step S804. In Step S844, in order to move the right indicator with the movement amount calculated in Step S804, the system control unit 50 determines the movement amount calculated in Step S804 to be the synchronized movement amount. The display position of the right indicator after the synchronized movement may be calculated from the display position of the left indicator after the movement in Step S843 and the relative position information acquired in Step S841. In addition, the movement amount (vector amount) from the current display position of the right indicator to the calculated display position may be calculated as the synchronized movement amount.

In Step S845, the system control unit 50 moves the right indicator with the movement amount (vector amount) calculated in Step S804. In Step S846, the system control unit 50 updates the relative position information stored in the system memory 218 based on the display position of the right indicator after the movement in Step S845.

According to the synchronized movement amount calculation processing 840, even in the case where a condition that the imaging unit 211 does not have the distance measurement unit or a condition that distance measurement accuracy of the distance measurement unit is poor is given, it becomes possible to efficiently set the synchronized movement amount of the indicator. Note that, in the case where a coordinate outside the right live image area is calculated as the coordinate X_R, the color of the left indicator or the right indicator may be changed, or a pop-up warning may be displayed in the display unit 108.

Note that, even in the case where the condition that the imaging unit 211 does not have the distance measurement unit or the condition that the distance measurement accuracy of the distance measurement unit is poor is given, the display position of the indicator may be determined by performing the arithmetic calculation represented by Formula 2 by using a predetermined distance as the object distance G. The predetermined distance is, e.g., a photographing distance which allows proper stereoscopic vision with VR display (e.g., stereoscopic vision having a high stereoscopic effect and a small amount of blurring).

In the case where the synchronized movement amount calculation processing 840 is performed, the right indicator is moved in synchronization with the movement of the left indicator while the relative positional relationship between the left and right indicators is maintained. In addition, when the right indicator is moved, the left indicator is not moved in synchronization. With this, for example, it becomes possible to perform an operation of finely adjusting the position of the right indicator after both of the left and right indicators are moved. Note that, when the right indicator is moved, the left indicator may be moved in synchronization. In this case, when the left indicator is moved, the right indicator may or may not be moved in synchronization.

Embodiment 2

Embodiment 2 of the present invention will be described. In Embodiment 2, a description will be given of an example in the case where the face frame is used as the indicator. The configurations of the camera 100, the lens unit 200, and the lens unit 300 are the same as those in Embodiment 1.

Indicator Operation

Figure 10A:
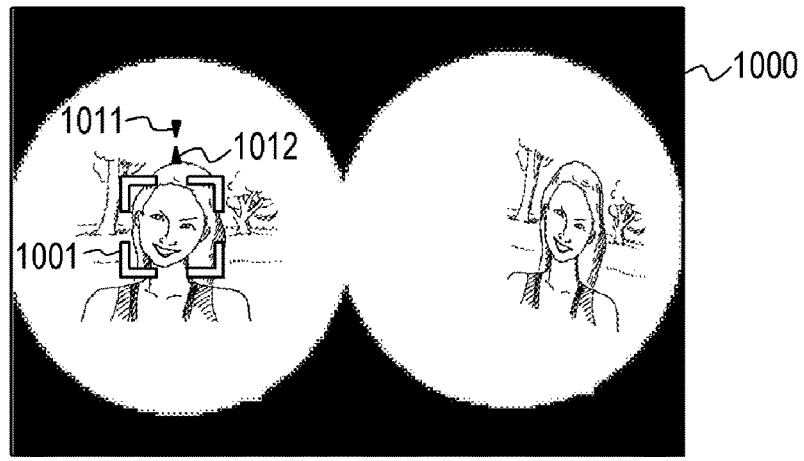
FIGS. 10A to 10C are views for explaining an indicator operation according to Embodiment 2.

An indicator operation according to Embodiment 2 and an operation corresponding to the indicator operation will be described by using FIGS. 10A and 10B. FIG. 10A shows a comparative example. A live image 1000 in FIG. 10A is a live image obtained by using the dual-lens unit. Various pieces of information such as a photographing parameter, the number of recorded images, and a remaining battery level may be displayed so as to be superimposed on a peripheral edge portion of the live image 1000. In a left live image area, a face frame 1001 and display parts 1011 and 1012 indicative of the focus state are displayed. In the left live image area, a face is shown at the center, and hence distortion of the face is small and the face can be detected. On the other hand, in a right live image area, the face is close to a peripheral edge portion (a peripheral edge portion of the right live image area) due to a parallax, and hence the distortion of the face is large, and the face is not detected.

Figure 10B:
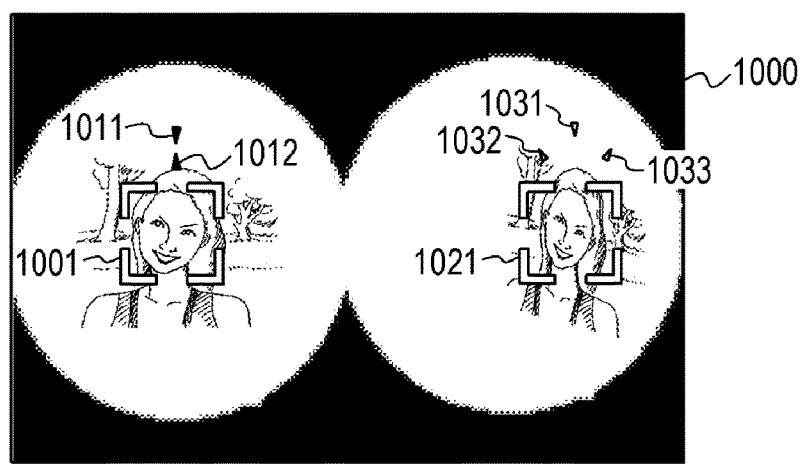

FIG. 10B shows a display example in Embodiment 2. By executing indicator display processing 1100 described later, a face frame 1021 and display parts 1031 to 1033 indicative of the focus state are displayed also in the right live image area. Even in the example in FIG. 10A, if it is possible to set the focus frame in the right live image area, the user can check the focus state in the right live image area. However, in Embodiment 2, the face frame (focus frame) is automatically displayed in the right live image area even without an operation of setting the focus frame in the right live image area, and the user can check the focus state in the right live image area.

Indicator Display Processing

Figure 11:
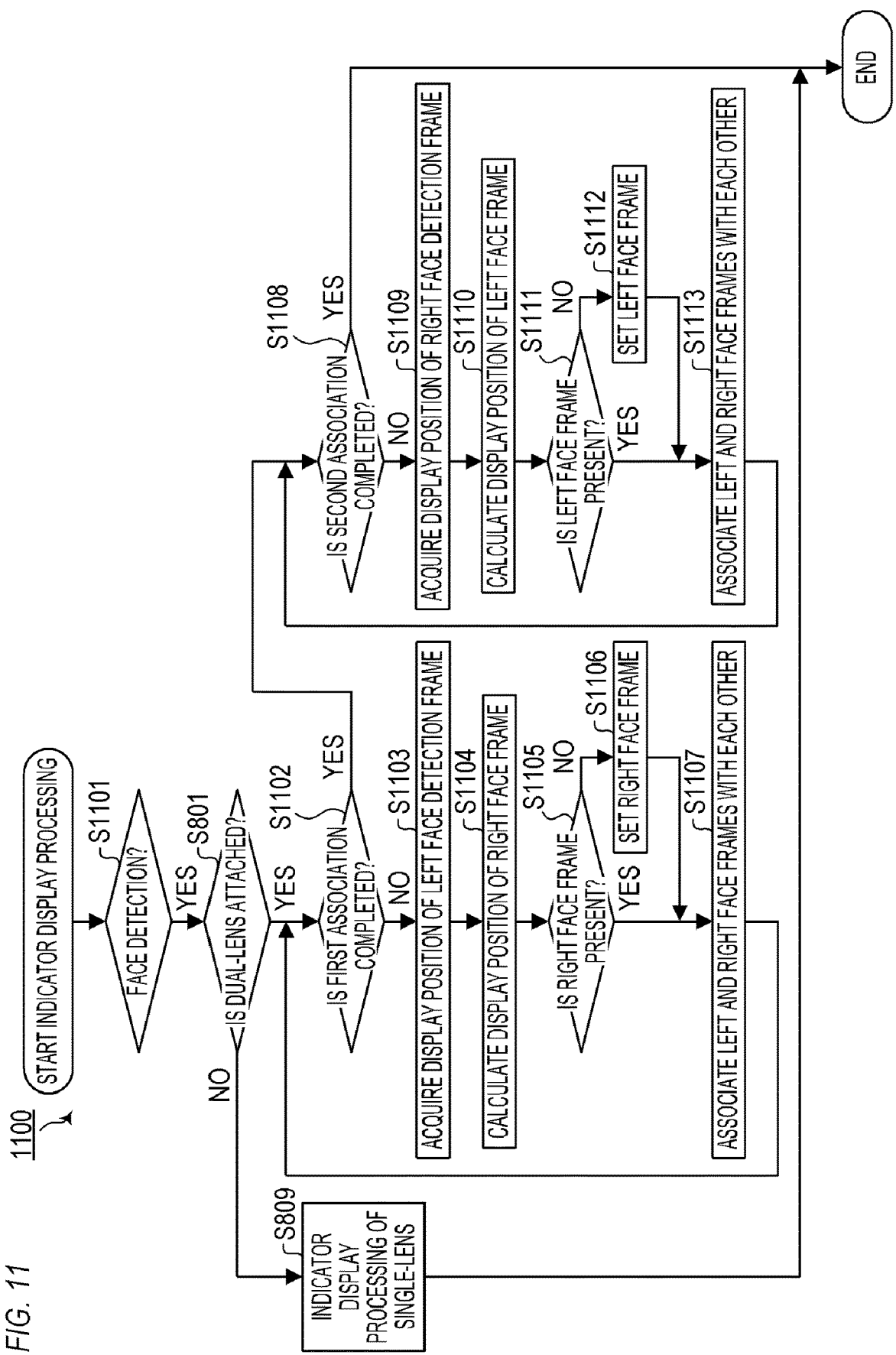
FIG. 11 is a flowchart showing indicator display processing according to Embodiment 2.

The indicator display processing according to Embodiment 2 will be described by using FIG. 11. FIG. 11 is a flowchart of the indicator display processing 1100 according to Embodiment 2. An operation in FIG. 11 is implemented by loading a program recorded in the non-volatile memory 219 into the system memory 218 and executing the program by the system control unit 50. For example, when the camera 100 is activated in the photographing mode or the mode of the camera 100 is switched to the photographing mode, the operation in FIG. 11 is started. In the following description, it is assumed that the display in the display unit 108 is performed, but the following display may be performed in the EVF 217.

In Step S1101, the system control unit 50 determines whether or not face detection is performed. For example, the determination of whether or not the face detection is performed can be set in advance. The processing proceeds to Step S801 in the case where it is determined that the face detection is performed and, otherwise (in the case where it is determined that the face detection is not performed), the indicator display processing 1100 is ended. In Step S801, in the case where it is determined that the single-lens unit (lens unit 200) is attached to the camera 100 or the lens unit is not attached to the camera 100, similarly to Embodiment 1, the processing proceeds to Step S809. Otherwise (in the case where it is determined that the dual-lens unit (lens unit 300) is attached to the camera 100), the processing proceeds to Step S1102.

In Step S1102, the system control unit 50 determines whether or not first association is completed. The first association is processing in which a face frame associated with a left face detection frame (a face frame indicative of a face detected from the left live image area) is set in the right live image area. In the case where it is determined that the first association is completed, i.e., the first association has been performed on all of the left face detection frames, the processing proceeds to Step S1108 and, otherwise (in the case where it is determined that the first association is not completed), the processing proceeds to Step S1103.

In Step S1103, the system control unit 50 acquires the display position of the left face detection frame with which a right face frame (a face frame in the right live image area) is not associated.

In Step S1104, the system control unit 50 calculates (estimates) the display position of the right face frame corresponding to the left face detection frame of which the display position is acquired in Step S1103 with a method similar to the synchronized movement amount calculation processing 820 in FIG. 8B.

In Step S1105, the system control unit 50 determines whether or not the right face frame is present at the display position (may include the vicinity thereof) calculated in Step S1104. This processing can also be viewed as processing of determining whether or not the face is detected at the display position calculated in Step S1104. The processing proceeds to Step S1107 in the case where it is determined that the right face frame is present (the face is detected) and, otherwise (in the case where it is determined that the right face frame is not present (the face is not detected)), the processing proceeds to Step S1106.

In Step S1106, the system control unit 50 sets the right face frame at the display position calculated in Step S1104. For example, a list for managing the result of the face detection to the right live image area is updated such that, even when the face is not detected at the display position calculated in Step S1104, the face is considered to be detected.

In Step S1107, the system control unit 50 associates the left face detection frame of which the display position is acquired in Step S1103 and the right face frame at the display position calculated in Step S1104 with each other.

In Step S1108, the system control unit 50 determines whether or not second association is completed. The second association is processing in which the face frame associated with a right face detection frame (a face frame indicative of the face detected from the right live image area) is set in the left live image area. The second association is performed on the right face detection frame with which the left face detection frame is not associated. In the case where it is determined that the second association is completed, i.e., the second association has been performed on all of the right face detection frames with which the left face detection frames are not associated, the indicator display processing 1100 is ended. Otherwise (in the case where it is determined that the second association is not completed), the processing proceeds to Step S1109.

In Step S1109, the system control unit 50 acquires the display position of the right face detection frame with which a left face frame (a face frame in the left live image area) is not associated.

In Step S1110, the system control unit 50 calculates the display position of the left face frame corresponding to the right face detection frame of which the display position is acquired in Step S1109 with a method similar to the synchronized movement amount calculation processing 820 in FIG. 8B.

In Step S1111, the system control unit 50 determines whether or not the left face frame is present at the display position (may include the vicinity thereof) calculated in Step S1110. This processing can also be viewed as processing of determining whether or not the face is detected at the display position calculated in Step S1110. The processing proceeds to Step S1113 in the case where it is determined that the left face frame is present (the face is detected) and, otherwise (in the case where it is determined that the left face frame is not present (the face is not detected)), the processing proceeds to Step S1112.

In Step S1112, the system control unit 50 sets the left face frame at the display position calculated in Step S1110. For example, a list for managing the result of the face detection to the left live image area is updated such that, even when the face is not detected at the display position calculated in Step S1110, the face is considered to be detected.

In Step S1113, the system control unit 50 associates the right face detection frame of which the display position is acquired in Step S1109 and the right face frame at the display position calculated in Step S1110 with each other.

According to Embodiment 2, in the case where the right face frame is present at the display position of the right face frame corresponding to the left face detection frame, the present right face frame is recognized as the right face frame corresponding to the left face detection frame. In addition, in the case where the right face frame is not present at the display position of the right face frame corresponding to the left face detection frame, the right face frame is controlled to be displayed at the display position. Similarly, in the case where the left face frame is present at the display position of the left face frame corresponding to the right face detection frame, the present left face frame is recognized as the left face frame corresponding to the right face detection frame. In the case where the left face frame is not present at the display position of the left face frame corresponding to the right face detection frame, the left face frame is controlled to be displayed at the display position. With this, even when the face frame is used as the indicator or the indicator is the face frame, it is possible to save the time and effort of the user and properly display the indicator.

Figure 10C:
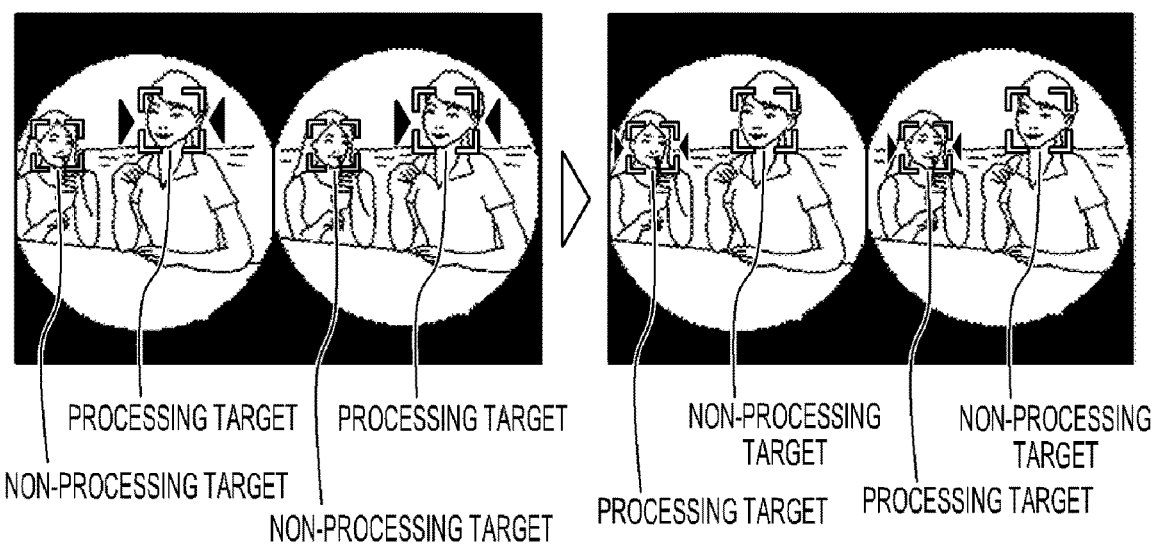

Note that various changes can be made according to operability desired by the user. For example, when the single-lens unit is attached, switching of an autofocus processing target between a plurality of face frames can be performed with the direction key 110. When the dual-lens unit is attached, as shown in FIG. 10C, switching of a processing target in the left live image area and switching of a processing target in the right live image area may be performed in synchronization with each other (are linked with each other) with the operation of the direction key 110. One of the switching of the processing target in the left live image area and the switching of the processing target in the right live image area may be performed with the operation of the direction key 110. In this case, the live image area in which the processing target is switched by the operation of the direction key 110 may be switched by the touch operation (e.g., the tap on the live image area in which the processing target is to be switched) to the touch panel 109. Display in which the association of the face frames can be identified by using the color or line type of the face frame and a subscript may also be performed.

Embodiment 3

Embodiment 3 of the present invention will be described. In Embodiment 3, the indicator which is displayed in synchronization is a sub-indicator (sub-guide). While it is possible to set whether or not the sub-indicator is displayed, even in the case where a setting in which the sub-indicator is not displayed is made, the sub-indicator is displayed in synchronization. The configurations of the camera 100, the lens unit 200, and the lens unit 300 are the same as those in Embodiment 1.

Indicator Operation

Figure 12A:
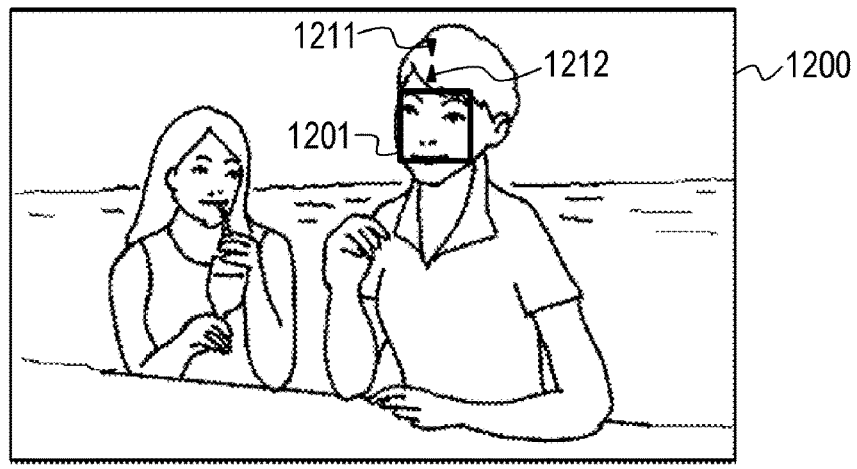
FIGS. 12A to 12C are views for explaining an indicator operation according to Embodiment 3.
Figure 12B:
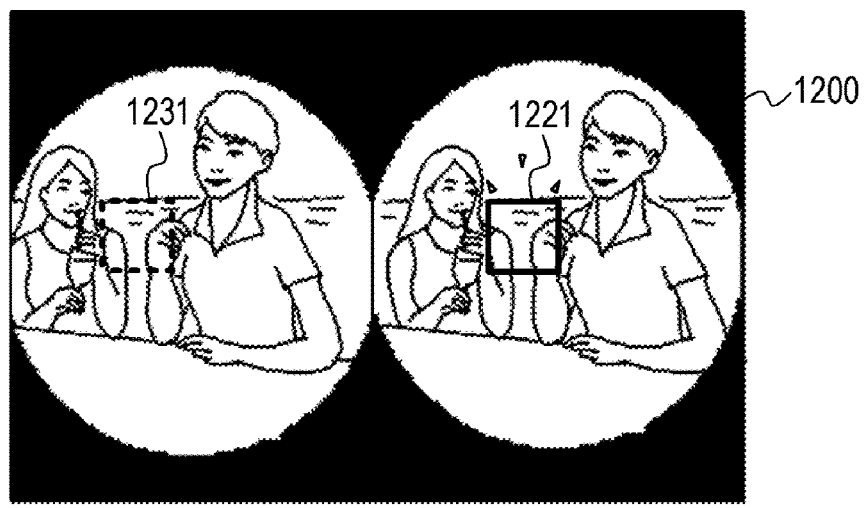
Figure 12C:
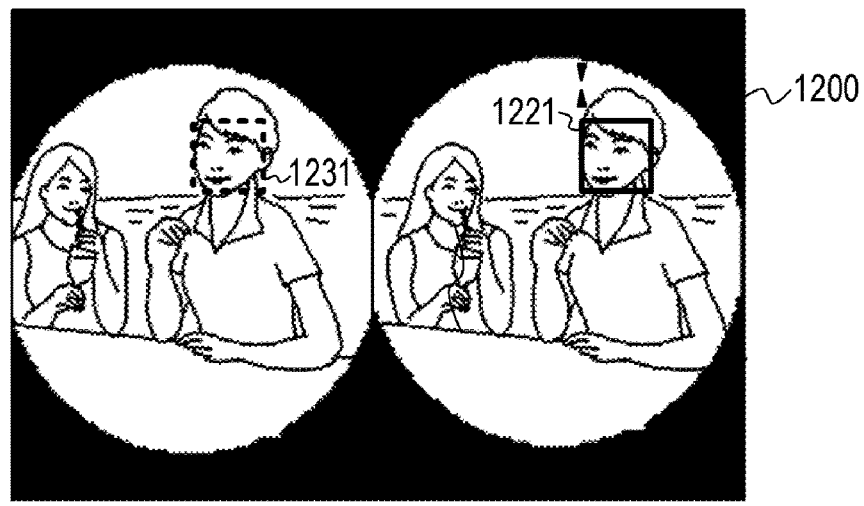

An indicator operation according to Embodiment 3 and an operation corresponding to the indicator operation will be described by using FIGS. 12A to 12C. FIG. 12A shows a live image 1200 displayed in the display unit 108 (or the EVF 217) in a state in which the lens unit 200 (single-lens unit) is attached to the camera 100. In FIG. 12A, a main frame 1201 is displayed as the focus frame so as to be superimposed on the live image 1200. Display parts 1211 and 1212 indicative of the focus state are displayed for the main frame 1201. The setting in which the sub-indicator is not displayed is made, and hence the sub-frame is not displayed. For example, the user can perform switching on a menu screen according to a photographing scene to determine whether or not the sub-indicator is displayed. Note that, in the case where the setting in which the sub-indicator is displayed is made, the sub-frame is also displayed. The main frame and the sub frame can be interchanged by a main/sub interchange operation of the touch operation or the key operation.

It is assumed that lens exchange is performed in a state in FIG. 12A, and the lens unit 300 (dual-lens unit) is attached to the camera 100. As a result, as shown in FIG. 12B, in the live image 1200, the image area (live image area) captured via the left-eye optical system 301L and the image area (live image area) captured via the right-eye optical system 301R are displayed so as to be arranged in the left-to-right direction. In addition, in Embodiment 3, indicator display processing 1300 described later is executed. With this, as shown in FIG. 12B, even in the case where the setting in which the sub-indicator is not displayed is made, a main frame 1221 is displayed so as to be superimposed on the right live image area, and a sub-frame 1231 is displayed so as to be superimposed on the left live image area. The main frame 1221 and the sub-frame 1231 are displayed so as to correspond to each other. In addition, the display parts indicative of the focus state are displayed for the main frame 1221. Subsequently, as shown in FIG. 12C, when the main frame 1221 is moved by the touch operation (e.g., the touch-move) to the touch panel 109, the sub-frame 1231 is moved in synchronization with the movement of the main frame 1221. Further, the main frame and the sub-frame can be interchanged by the main/sub interchange operation of the touch operation or the key operation. Consequently, it is possible to save the time and effort of the user and shorten the operation time.

In addition, also when the live image obtained by using the single-lens unit is displayed, it is possible to display one main indicator and one or more sub-indicators. Also when the live image obtained by using the dual-lens unit is displayed, only one main indicator is displayed, and hence it is possible to use the processing in the case where the single-lens unit is used, and suppress an increase in the capacity of the non-volatile memory 219. It is possible to reduce a processing load by displaying the display part indicative of the focus state only in one of the live image areas. Note that, in the case where it is desired to check the focus states of both of the left and right live image areas at the same time, as shown in FIG. 6B, it is only required that the main indicators (the main frame, and the display part indicative of the focus state) are displayed in both of the left and right live image areas.

Indicator Display Processing

Indicator display processing according to Embodiment 3 will be described by using FIG. 13. FIG. 13 is a flowchart of the indicator display processing 1300 according to Embodiment 3. An operation in FIG. 13 is implemented by loading a program recorded in the non-volatile memory 219 into the system memory 218 and executing the program by the system control unit 50. For example, when the camera 100 is activated in the photographing mode or the mode of the camera 100 is switched to the photographing mode, the operation in FIG. 13 is started. In the following description, it is assumed that the display in the display unit 108 is performed, but the following display may also be performed in the EVF 217. In addition, in FIG. 13, the same processing steps as those in FIG. 8A (Embodiment 1) are designated by the same reference numerals as those in FIG. 8A, and the description thereof will be omitted.

In Step S1301, the system control unit 50 performs a setting such that the sub-indicator is displayed. With this, even when the setting in which the sub-indicator is not displayed is made before the dual-lens unit is attached, the setting is forcibly changed to the setting in which the sub-indicator is displayed. At this point, a set value before the change may be retained, and the setting may be restored with the set value before the change after the dual-lens unit is detached. The sub-indicator may also be forcibly displayed without changing the setting.

In Step S1302, the system control unit 50 displays the main indicator in the right live image area. In Step S1303, the system control unit 50 displays the sub-indicator in the left live image area.

Note that the main indicator is displayed in the right live image area and the sub-indicator is displayed in the left live image area so as to correspond to the main indicator, but the present embodiment is not limited thereto. For example, the main indicator may be displayed in the left live image area, and the sub-indicator may be displayed in the right live image area so as to correspond to the main indicator.

While the present invention has been described in detail thus far based on its preferred embodiments, the present invention is not limited to these specific embodiments, and various forms without departing from the gist of the invention are also included in the present invention. Further, each of the above embodiments merely represents one embodiment of the present invention, and the individual embodiments can be combined appropriately.

For example, the description has been given of the example in which the indicator includes the focus guide frame and the face frame, but the indicator may include a frame which assists exposure adjustment such as an automatic exposure frame which determines an area in which automatic exposure adjustment is performed. In addition, the above-described various control operations which have been described as the control operations performed by the system control unit 50 may be performed by one piece of hardware, and control of the entire apparatus may be performed by sharing processing among a plurality of pieces of hardware (e.g., a plurality of processors or circuits).

In addition, the present invention is not limited to the camera (imaging apparatus), and can be applied to any electronic equipment which can perform control such that the indicator is displayed so as to be superimposed on the captured image. For example, the present invention can be applied to a PDA, a mobile phone terminal, a portable image viewer, a printer apparatus, a digital photo frame, a music player, a game machine, and an electronic book reader. Further, the present invention can be applied to a video player, a display apparatus (including a projector), a tablet terminal, a smartphone, an AI speaker, a household electric appliance, and a vehicle-mounted apparatus. The present invention can also be applied to a multi-lens smartphone having a plurality of optical systems of different types such as a normal lens, a wide-angle lens, and a zoom lens. Even in such a case, by performing photographing after causing focal lengths (zoom magnifications) of two optical systems to be used to match each other (sharing one focal length), it is possible to obtain an image which allows stereoscopic vision.

According to the present invention, it is possible to properly display an indicator for one image in which two image areas captured by using two optical systems individually are arranged side by side.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-020270, filed on Feb. 14, 2022, which is hereby incorporated by reference herein in its entirety.

What is claimed is:

1. An electronic apparatus comprising:
   a processor; and
   a memory storing a program which, when executed by the processor, causes the electronic apparatus to:
   (1) acquire an image captured by an imaging element,
   (2) receive an operation by a user,
   (3) perform control such that the image is displayed,
   (4) perform control such that a first indicator which is an indicator of a first type is displayed so as to be superimposed on the image,
   (5) perform control such that a second indicator which is an indicator of a second type is displayed so as to be superimposed on the image,
   (6) perform control such that the first indicator is moved in response to execution of a first operation on the first indicator by the user, and
   (7) perform control such that the second indicator is moved in response to execution of a second operation, which is different from the first operation, on the second indicator by the user,
   wherein in a case where a first image captured via an optical system is acquired,
   (a) control is performed such that the first indicator and the second indicator are displayed so as to be superimposed on the first image, (b) control is performed such that the first indicator is not moved in synchronization with the movement of the second indicator in response to execution of the second operation, and (c) control is performed such that the second indicator is not moved in synchronization with the movement of the first indicator in response to execution of the first operation, and
   wherein in a case where a second image in which a first image area captured via a first optical system and a second image area captured via a second optical system are arranged side by side is acquired, (a) control is performed such that the first indicator is displayed so as to be superimposed on the first image area, (b) control is performed such that the second indicator is displayed so as to be superimposed on the second image area, (c) control is performed such that the first indicator is moved in synchronization with the movement of the second indicator in response to execution of the second operation, and (d) control is performed such that the second indicator is moved in synchronization with the movement of the first indicator in response to execution of the first operation.

2. The electronic apparatus according to claim 1, wherein the second image in which the first image area and the second image area arranged side by side is an image captured by using a lens unit including the first optical system and the second optical system.

3. The electronic apparatus according to claim 1, wherein when the program is executed by the processor, the program further causes the electronic apparatus to:
(1) determine a first position of the first indicator on the imaging element from a display position of the first indicator,
(2) determine a second position of the second indicator on the imaging element from the first position of the first indicator on the imaging element, a focal length common to the first optical system and the second optical system, a distance from an object indicated by the first indicator to the first optical system or the second optical system, and a distance between an optical axis of the first optical system and an optical axis of the second optical system, and
(3) determine a display position of the second indicator from the second position.

4. The electronic apparatus according to claim 1, wherein control is performed such that another one of the first indicator and the second indicator is moved in synchronization with movement of one of the first indicator and the second indicator while a relative positional relationship between the first indicator and the second indicator is maintained in a case where the second image is acquired.

5. The electronic apparatus according to claim 1, wherein each of the first indicator and the second indicator includes a frame which assists focus adjustment.

6. The electronic apparatus according to claim 5, wherein at least one of the first indicator and the second indicator indicates a focus state.

7. The electronic apparatus according to claim 1, wherein each of the first indicator and the second indicator includes a face frame,
wherein when the program is executed by the processor, the program further causes the electronic apparatus to (1) determine a first position of the first indicator on the imaging element from a display position of the first indicator, (2) determine a second position of the second indicator on the imaging element from the first position of the first indicator on the imaging element, a focal length common to the first optical system and the second optical system, a distance from an object indicated by the first indicator to the first optical system or the second optical system, and a distance between an optical axis of the first optical system and an optical axis of the second optical system, and (3) determine a display position of the second indicator from the second position,
wherein in a case where the face frame is present at the display position of the second indicator, the face frame is recognized as the second indicator, and,
wherein in a case where the face frame is not present at the display position of the second indicator, control is performed such that the second indicator is displayed at the display position.

8. The electronic apparatus according to claim 1, wherein each of the first indicator and the second indicator includes a frame which assists exposure adjustment.

9. The electronic apparatus according to claim 1, wherein when the program is executed by the processor, the program further causes the electronic apparatus to perform setting of whether or not the second indicator is displayed,
wherein in a case where the first image is acquired, control is performed such that the first indicator is displayed so as to be superimposed on the first image, and control is performed such that the second indicator is displayed so as to be superimposed on the first image according to the setting of whether or not the second indicator is displayed, and
wherein in a case where the second image is acquired, even in a case of the setting in which the second indicator is not displayed, control is performed such that the first indicator is displayed so as to be superimposed on the first image area, and control is performed such that the second indicator is displayed so as to be superimposed on the second image area.

10. A control method of an electronic apparatus, the control method comprising:
acquiring an image captured by an imaging element;
receiving an operation by a user;
performing control such that the image is displayed;
performing control such that a first indicator which is an indicator of a first type is displayed so as to be superimposed on the image;
performing control such that a second indicator which is an indicator of a second type is displayed so as to be superimposed on the image;
performing control such that the first indicator is moved in response to execution of a first operation on the first indicator by the user; and
performing control such that the second indicator is moved in response to execution of a second operation, which is different from the first operation, on the second indicator by the user,
wherein in a case where a first image captured via an optical system is acquired,
(a) control is performed such that the first indicator and the second indicator are displayed so as to be superimposed on the first image, (b) control is performed such that the first indicator is not moved in synchronization with the movement of the second indicator in response to execution of the second operation, and (c) control is performed such that the second indicator is not moved in synchronization with the movement of the first indicator in response to execution of the first operation, and
wherein in a case where a second image in which a first image area captured via a first optical system and a second image area captured via a second optical system are arranged side by side is acquired, (a) control is performed such that the first indicator is displayed so as to be superimposed on the first image area, (b) control is performed such that the second indicator is displayed so as to be superimposed on the second image area, (c) control is performed such that the first indicator is moved in synchronization with the movement of the second indicator in response to execution of the second operation, and (d) control is performed such that the second indicator is moved in synchronization with the movement of the first indicator in response to execution of the first operation.

11. A non-transitory computer readable medium that stores a program, wherein the program causes a computer to execute a control method of an electronic apparatus, the control method comprising:
acquiring an image captured by an imaging element;
receiving an operation by a user;
performing control such that the image is displayed;
performing control such that a first indicator which is an indicator of a first type is displayed so as to be superimposed on the image;

performing control such that a second indicator which is an indicator of a second type is displayed so as to be superimposed on the image;

performing control such that the first indicator is moved in response to execution of a first operation on the first indicator by the user; and performing control such that the second indicator is moved in response to execution of a second operation, which is different from the first operation, on the second indicator by the user, wherein in a case where a first image captured via an optical system is acquired, (a) control is performed such that the first indicator and the second indicator are displayed so as to be superimposed on the first image, (b) control is performed such that the first indicator is not moved in synchronization with the movement of the second indicator in response to execution of the second operation, and (c) control is performed such that the second indicator is not moved in synchronization with the movement of the first indicator in response to execution of the first operation, and wherein in a case where a second image in which a first image area captured via a first optical system and a second image area captured via a second optical system are arranged side by side is acquired, (a) control is performed such that the first indicator is displayed so as to be superimposed on the first image area, (b) control is performed such that the second indicator is displayed so as to be superimposed on the second image area, (c) control is performed such that the first indicator is moved in synchronization with the movement of the second indicator in response to execution of the second operation, and (d) control is performed such that the second indicator is moved in synchronization with the movement of the first indicator in response to execution of the first operation.

12. An electronic apparatus comprising:

a processor; and a memory storing a program which, when executed by the processor, causes the electronic apparatus to:

(1) acquire an image captured by an imaging element, (2) receive an operation by a user, (3) perform control such that the image is displayed, (4) perform control such that an indicator is displayed so as to be superimposed on the image, (5) perform setting of whether or not a second indicator which is an indicator of a second type is displayed, (6) perform control such that a first indicator which is an indicator of a first type is moved in response to execution of a first operation on the first indicator by the user, and (7) perform control such that the second indicator is moved in response to execution of a second operation, which is different from the first operation, on the second indicator by the user, wherein in a case where a first image captured via an optical system is acquired, (a) control is performed such that the first indicator is displayed so as to be superimposed on the first image, and (b) control is performed such that the second indicator is displayed so as to be superimposed on the first image according to the setting of whether or not the second indicator is displayed, wherein in a case where a second image in which a first image area captured via a first optical system and a second image area captured via a second optical system are arranged side by side is acquired, (a) control is performed such that the first indicator is displayed so as to be superimposed on the first image area, (b) control is performed such that the second indicator is displayed so as to be superimposed on the second image area even in a case of the setting in which the indicator of the second type is not displayed, (c) control is performed such that the first indicator is moved in synchronization with the movement of the second indicator in response to execution of the second operation, and (d) control is performed such that the second indicator is moved in synchronization with the movement of the first indicator in response to execution of the first operation.

13. The electronic apparatus according to claim 1, wherein in a case where the first image is acquired, the first indicator indicates an area which is a focus adjustment target in the first image, and the second indicator indicates an area which is not the focus adjustment target in the first image, and wherein in a case where the second image is acquired, the first indicator and the second indicator indicate areas which are focus adjustment targets in the second image.

* * * * *